(12) United States Patent
Gebelein

(10) Patent No.: US 7,672,070 B2
(45) Date of Patent: Mar. 2, 2010

(54) METHODS AND APPARATUS PROVIDING IMPROVED VISUAL CAPABILITIES OF OPTICAL INSTRUMENTS

(75) Inventor: Rolin Gebelein, Santa Cruz, CA (US)

(73) Assignee: Gebelein Family Trust, Santa Cruz, CA (US)

( * ) Notice: Subject to any disclaimer, the term of this patent is extended or adjusted under 35 U.S.C. 154(b) by 240 days.

(21) Appl. No.: 11/469,605

(22) Filed: Sep. 1, 2006

(65) Prior Publication Data

US 2007/0081261 A1  Apr. 12, 2007

Related U.S. Application Data

(63) Continuation-in-part of application No. 11/379,839, filed on Apr. 24, 2006.

(60) Provisional application No. 60/724,506, filed on Oct. 7, 2005, provisional application No. 60/729,552, filed on Oct. 22, 2005, provisional application No. 60/753,661, filed on Dec. 23, 2005.

(51) Int. Cl.
*G02B 5/22* (2006.01)
*F41G 1/38* (2006.01)

(52) U.S. Cl. .......................................... 359/889; 42/119
(58) Field of Classification Search ................. 359/885, 359/889; 42/119–129
See application file for complete search history.

(56) References Cited

U.S. PATENT DOCUMENTS

| | | | | |
|---|---|---|---|---|
| 4,392,187 A | * | 7/1983 | Bornhorst | ................. 362/233 |
| 4,848,894 A | | 7/1989 | Buser et al. | |
| 5,214,494 A | * | 5/1993 | Inaba et al. | ................. 356/419 |
| 6,157,025 A | | 12/2000 | Katagiri et al. | |
| 6,449,419 B1 | | 9/2002 | Brough et al. | |
| 6,492,635 B2 | * | 12/2002 | Simchoni | ................. 250/225 |
| 2005/0252062 A1 | * | 11/2005 | Scrogin et al. | ................. 42/119 |

* cited by examiner

*Primary Examiner*—Alessandro Amari
(74) *Attorney, Agent, or Firm*—Donald R. Boys; Central Coast Patent Agency, Inc.

(57) ABSTRACT

An apparatus for forming an image has one or more lenses in an optical path, at least one angular-sensitive light transmission filter in the optical path, in which transmission varies with change in angular orientation of the filter with reference to the direction of light in the optical path, and a mechanism for adjusting the angle of the light transmission filter.

6 Claims, 24 Drawing Sheets

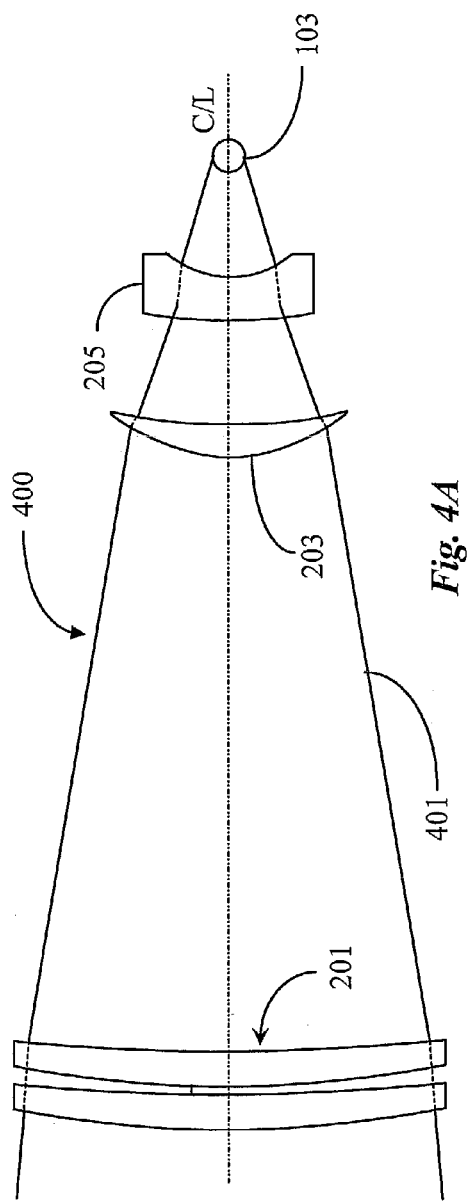
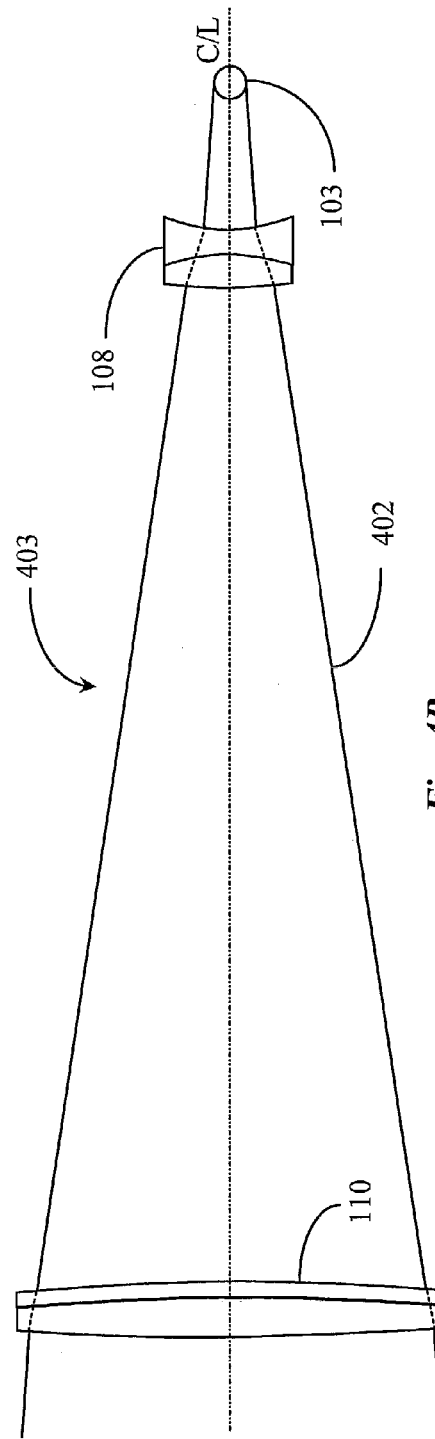

| LENS | Front Radius | Back Radius | CT | Space | Matl. | DIA |
|---|---|---|---|---|---|---|
| Objective (1) | 4.62 CX | 10.01 CC | 0.45 | 0.05 | Acrylic | 2.40 |
| Objective (2) | 3.79 CX | 4.63 CC | 0.35 | 4.07 | Acrylic | 2.40 |
| Fld Lens (3) | 0.82 CX | 1.81 CC | 0.30 | 0.33 | BS-Crown | 1.35 |
| Eye Lens (4) | 15.79 CX | 0.65 CC | 0.13 | —— | Polycarb | 1.00 |

METHODS AND APPARATUS PROVIDING IMPROVED VISUAL CAPABILITIES OF OPTICAL INSTRUMENTS

CROSS-REFERENCE TO RELATED APPLICATIONS

The present application is a continuation-in-part of application Ser. No. 11/379,839, filed on Apr. 24, 2006, which claims priority to a U.S. provisional patent application No. 60/724,506 filed on Oct. 7, 2005, 60/729,552 filed on Oct. 22, 2005, and 60/753,661 filed on Dec. 23, 2005. The above referenced applications are included herein in their entirety in this specification at least by reference.

BACKGROUND OF THE INVENTION

1. Field of the Invention

The present invention is in the field of optical instruments including binocular field glasses and colorized glasses such as sunglasses or the like. The invention pertains particularly to methods and apparatus providing improved visual capabilities of optical instruments.

2. Discussion of the State of the Art

Classical Galilean binoculars have the advantage over modern prism binoculars of producing an erect virtual image for a user and are not equipped with prisms or other devices. The entrance pupil of the eye must coincide with the optical axis of the Galilean telescope or binocular for successful viewing. The construction of Galilean binoculars and the implementation of optics therein enable a field of view which may be rather limited.

A common limitation of standard Galilean binoculars and one that is not necessarily limited to Galilean binoculars is that it may be very difficult to see clearly through them when using them to view certain action-intense sporting events. This is due in part to the small exit pupil size and to specific eye relief limitations. One with skill in the art of binocular viewing may appreciate these limitations by simply holding a binocular up to a source of light and away from the user's face. The small circular exit pupils may then be observed as de-magnified images of the front objectives within the eye lenses of Galilean binoculars, or illuminated in mid air at a short fixed distance behind the eye lenses of modern prism binoculars. That short fixed distance is termed the binocular "eye relief" in the art and may vary somewhat among different binocular designs. To use these binocular systems successfully, it is necessary to place both pupils of ones eyes directly in line with these small exit pupils and exactly at the precise fixed distance behind the eye lenses with modern prism binoculars. If this were not done, the user would not see anything. Logically then, maintaining that position with respect to keeping the pupils at the exit pupil locations is very difficult during fast moving sports activities. Wearing of eyeglasses or sunglasses may also severely limit successful viewing.

Typically, the objective lenses of Galilean binoculars are positive achromatic doublets each comprised of a positive element made of a crown glass or acrylic plastic material and also a negative element to correct color aberrations made of a flint glass or polycarbonate type of plastic material. The positive element is very expensive to manufacture using plastic molding techniques especially in large diameter short focal lengths. Visual limitations occur because of a fact that the thin peripheral edges of the positive element cool more quickly than the thick centers of the lens and so the surface "slumps" or becomes distorted and therefore less able to produce sharp contrast and clear imaging.

Still other fixed conditions associated with using a Galilean or a more modern binocular system may be construed to be limitations for which a solution may be provided. For example, it is generally known that one must continually refocus a typical binocular system to compensate for the varying object distance created by the moving players of the sporting event. Also known is that the binocular system must be adjusted to a proper eye separation distance between a user's eyes. Still other limitations may exist such as lack of color contrast imaging enhancements and chromatic imaging adjustments which are typically not available in an affordable and practical manner to most standard binocular systems.

Binoculars are useful in magnifying the appearance of distant objects and often utilize anti-reflection or other coatings to reduce "glare" that may occur under certain use conditions. However, the color contrast of images is generally always fixed by the lens properties and the results thereof may be far from optimum for viewing substantial detail of images under a variety of conditions.

Colored or tinted glasses, like sunglasses, for example, are used to diminish light intensity for comfort's sake, and are also worn for appearance sake. Sunglasses are often provided with colored lenses for appearance. Colored lenses may also be used to provide enhanced contrast in objects viewed such as with ordinary "driving glasses" or "shooters' glasses" where orange or yellow tinted lenses are employed to improve visual contrast by reducing the blue end of the color spectrum. However, these colored glasses provide only limited vision enhancement because the contrast is limited by the fixed color of the lenses employed.

Therefore, what is clearly needed in the art are methods and apparatus for improving the visual capabilities of optical instruments including binocular systems and, in some cases, colored glasses or sunglasses, among other optical apparatus. Such improvements and methods of implementation and use would provide more reliable and entertaining viewing through such optical instruments and apparatus without requiring significant alteration or expense related to existing designs and configurations.

SUMMARY OF THE INVENTION

In one embodiment of the present invention an apparatus for forming an image is provided, comprising one or more lenses in an optical path, at least one angular-sensitive light transmission filter in the optical path, in which transmission varies with change in angular orientation of the filter with reference to the direction of light in the optical path, and a mechanism for adjusting the angle of the light transmission filter.

In one embodiment the apparatus may be a camera with at least one lens in an optical path, providing an image to a light-sensitive medium for capturing the image. Also in some embodiments the light transmission filter and associated adjustment mechanism are positioned before the lens in the optical path of incident light.

In another embodiment the apparatus comprises a spotting scope with an eye lens and an objective lens, providing an image to a user's eye, and the light transmission filter and associated adjustment mechanism may be positioned just ahead of the eye lens in the optical path of incident light.

In another embodiment the apparatus comprises a pair of goggles having a lens for each of a user's eyes, and a separate optical path for each eye, and there may be a separate light transmission filter adjacent the lens for each eye, and each filter comprises a separate adjustment mechanism for changing the angle of the filter relative to the direction of the path of incident light.

In yet another embodiment the apparatus comprises a telescope eyepiece having an eye lens providing an image to a user's eye, and the light transmission filter and associated adjustment mechanism may be positioned just ahead of the eye lens in the optical path of incident light.

In still another embodiment the apparatus comprises a telescopic gunsight having an eye lens and an objective lens, and the light transmission filter and associated adjustment mechanism may be positioned just ahead of the objective lens in the path of incident light.

In another aspect of the invention a method for improving color contrast for an image provided by an optical instrument is provided, comprising steps of (a) placing an angle-sensitive light transmission filter in the optical path of light transmitted through the instrument; and (b) changing the angle of the light-transmission filter by an adjustment mechanism.

In one embodiment of the method the instrument is a camera with at least one lens in the optical path, providing an image to a light-sensitive medium for capturing the image. Also in some in step (a) the light transmission filter and associated adjustment mechanism are placed before the lens in the optical path of incident light.

In another embodiment the instrument comprises a spotting scope with an eye lens and an objective lens, providing an image to a user's eye, and the light transmission filter and associated adjustment mechanism may be placed just ahead of the eye lens in the optical path of incident light.

In yet another embodiment the instrument comprises a pair of goggles having a lens for each of a user's eyes, and a separate optical path for each eye, and there may be a separate light transmission filter adjacent the lens for each eye, and each filter comprises a separate adjustment mechanism for changing the angle of the filter relative to the direction of the path of incident light.

In still another embodiment the optical instrument comprises a telescope eyepiece having an eye lens providing an image to a user's eye, and the light transmission filter and associated adjustment mechanism may be positioned just ahead of the eye lens in the optical path of incident light.

In still another embodiment the optical instrument comprises a telescopic gunsight having an eye lens and an objective lens, and the light transmission filter and associated adjustment mechanism may be positioned just ahead of the objective lens in the path of incident light.

In still another embodiment of the invention the apparatus comprises a zoom lens riflescope having an eye lens, an objective lens, and a center lens to provide an upright image for the eyelens, and in some embodiments the light transmission filter and associated adjustment mechanism are positioned in the light path where the optical beam is most narrow between the center lens and the objective lens, and in some other embodiments the light transmission filter and associated adjustment mechanism are positioned in the light path where the optical beam is most narrow between the center lens and the zoom eyelens.

In yet another embodiment of the method of the invention the apparatus comprises a zoom lens riflescope having an eye lens, an objective lens, and a center lens to provide an upright image for the eyelens, and in some embodiments the light transmission filter and associated adjustment mechanism are positioned in the light path where the optical beam is most narrow between the center lens and the objective lens, and in some other embodiments the light transmission filter and associated adjustment mechanism are positioned in the light path where the optical beam is most narrow between the center lens and the zoom eyelens.

BRIEF DESCRIPTION OF THE DRAWING FIGURES

FIG. 4A is a block diagram illustrating a lens arrangement analogous to the lens arrangement of FIG. 2A in side view.

FIG. 4B is a block diagram illustrating a lens arrangement 403 analogous to the lens arrangement of FIG. 1A in side view.

DETAILED DESCRIPTION

Figure 1A:
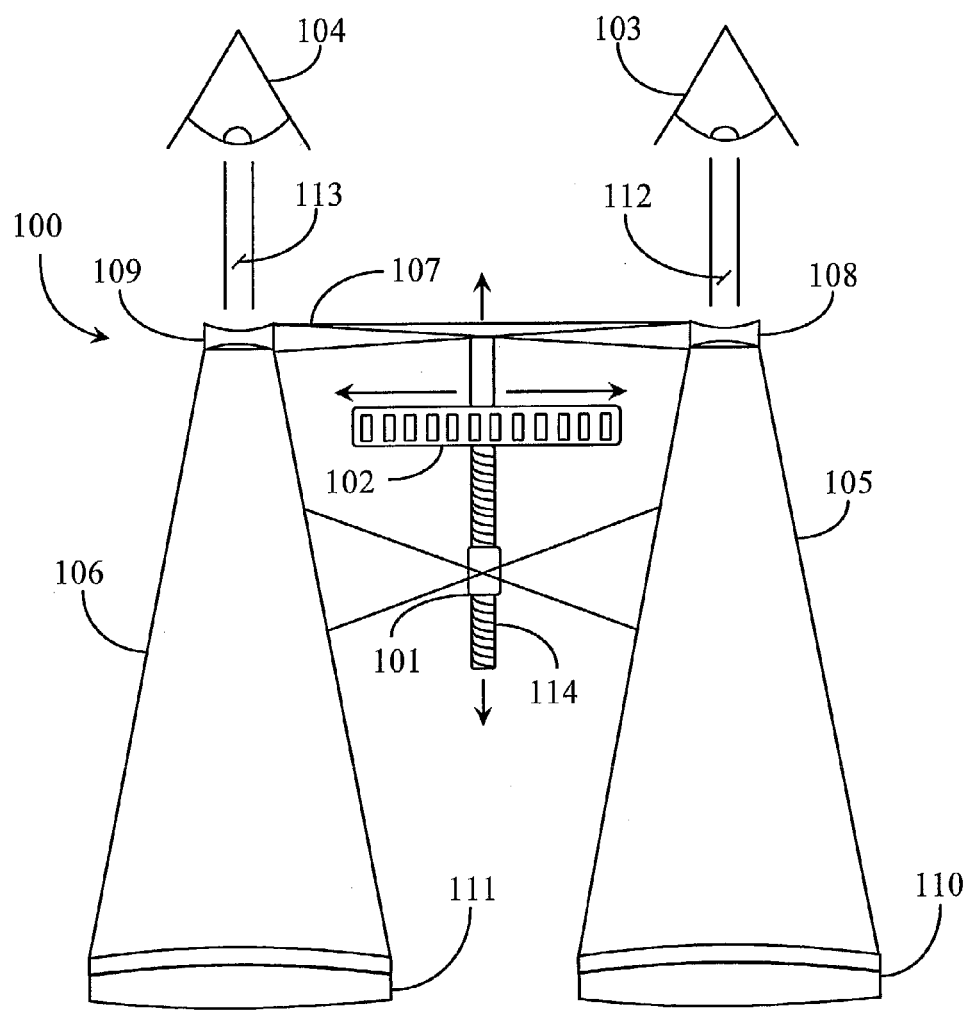
FIG. 1A is a block diagram illustrating component arrangement of a Galilean binocular system according to prior art.
Figure 1B:
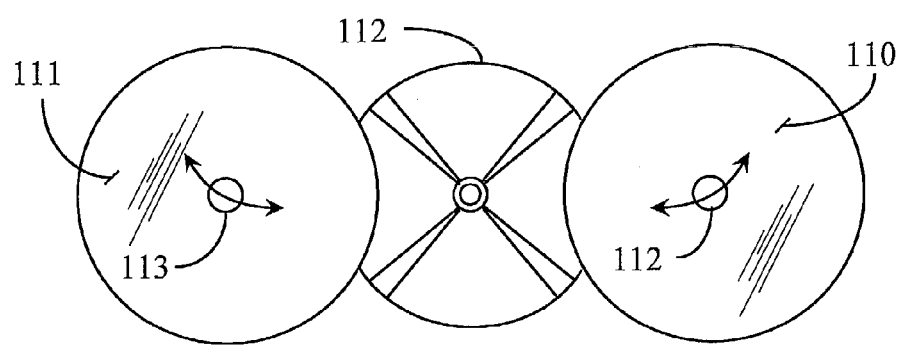
FIG. 1B is a front view of the binocular system of FIG. 1A.

FIG. 1A is a block diagram illustrating component arrangement of a Galilean binocular system 100 according to prior art. System 100 illustrates a typical Galilean construction for a binocular. FIG. 1B is a front view of the binocular system of FIG. 1A.

Referring now to FIG. 1A, a binocular barrel 105 and a binocular barrel 106 are illustrated as being hinged together and affixed in a substantially parallel relationship to one another. A hinge 101 is illustrated in this example and functions as a center hinge, about which barrels 105 and 106 may be rotated in a limited fashion to provide some adjustment for eye separation distance in order to accommodate a user's eyes. A user's eyes are illustrated in this example as eye 103 and eye 104.

System 100 includes a center shaft 114 that supports at least one hinge 101 including fixed arms attached at the barrels for supporting and controlling those barrels. Shaft 114 is threaded about a portion thereof for accommodating a forward and rearward motion-focusing wheel 102. Focusing wheel 102 controls forward and rearward movement of a pair of eye lenses illustrated herein as ocular lenses 108 and 109. A bridging mechanism or eye lens carrier 107 supports the lenses in a substantially parallel relationship and supports translation of forward and rearward movement of lenses 108 and 109 along the line of sight axis, such translation controlled manually by rotation of wheel 102 according to the associated directional arrows illustrated. Other types of focus systems are known in the art, however Galilean systems typically focus by manual turning of wheel 102 to advance or retreat lens pair (108, 109) to bring an object into focus.

System 100 includes a pair of objective lenses including objective 110 and objective 111. In this example, objective lenses 110 and 111 are achromatic doublets known in the art and typical of Galilean construction. Not withstanding the obvious focus function and eye separation adjustment capabilities of system 100, system 100 exhibits a very small exit pupil within the eye lens. This is illustrated herein as an exit stream of light 112 and an exit stream of light 113. The descriptor "small exit pupil" is meant to infer that the width of the light streams from system 100 to user eyes 103 and 104 is very small, perhaps just covering the diameter of a use's pupils, or less. Therefore, in order to obtain a comfortable and clear view of an object magnified by system 100 it is necessary that eye separation adjustments and focusing adjustments be made manually by the user.

Referring now to FIG. 1B, objectives 110 and 111 may be rotated inward, shortening eye separation, or outward increasing eye separation. Exit pupils 112 and 113 are illustrated from the perspective of the objective lens. Double arc-shaped arrows illustrate the rotation path of the barrels about hinge 101. The Galilean design does not produce "exit pupils" at definite "eye relief" distance and thus the eyes may be placed at various distances behind the instrument. However, due to relatively small diameter exit beams 112 and 113, the image of the field of view will rapidly become smaller as the eye is placed further behind the ocular lens.

Figure 2A:
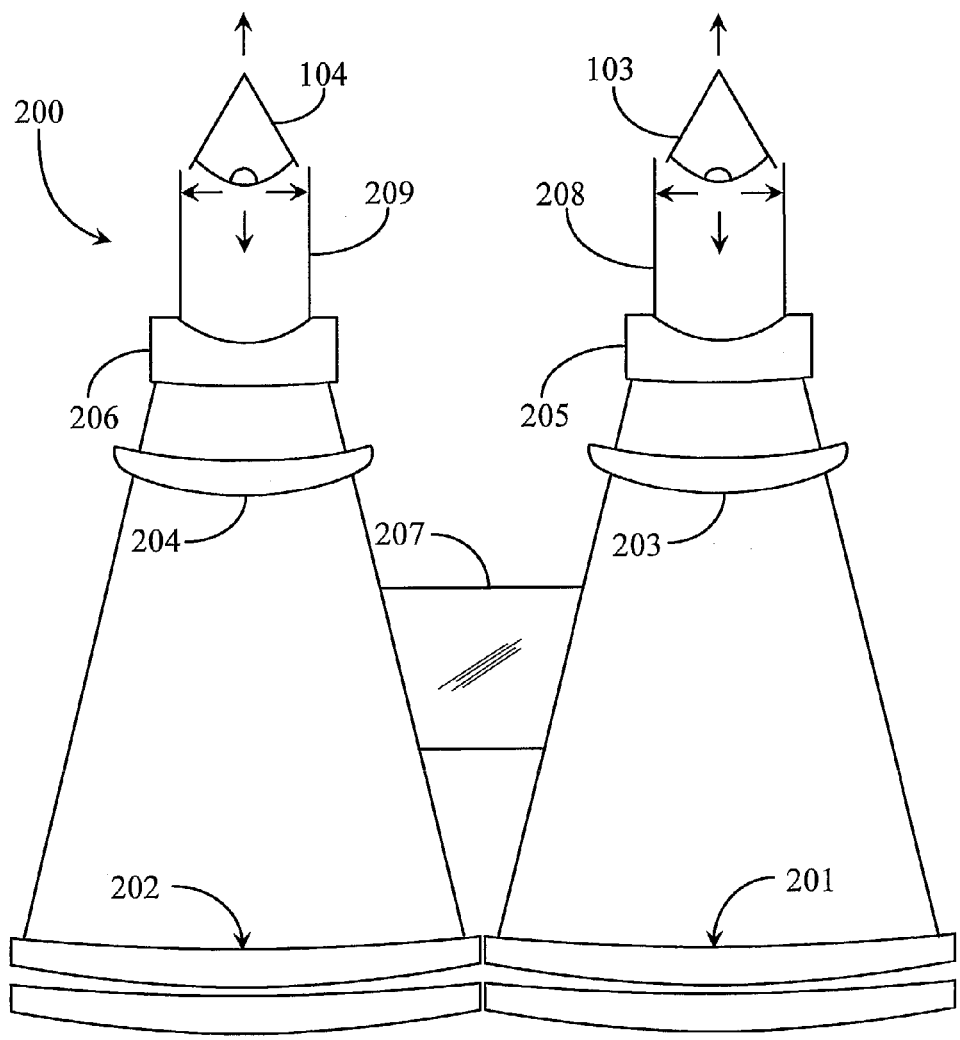
FIG. 2A is a block diagram illustrating component arrangement of a Galilean binocular system adapted for optimal visual capability with minimal control requirements according to an embodiment of the present invention.
Figure 2B:
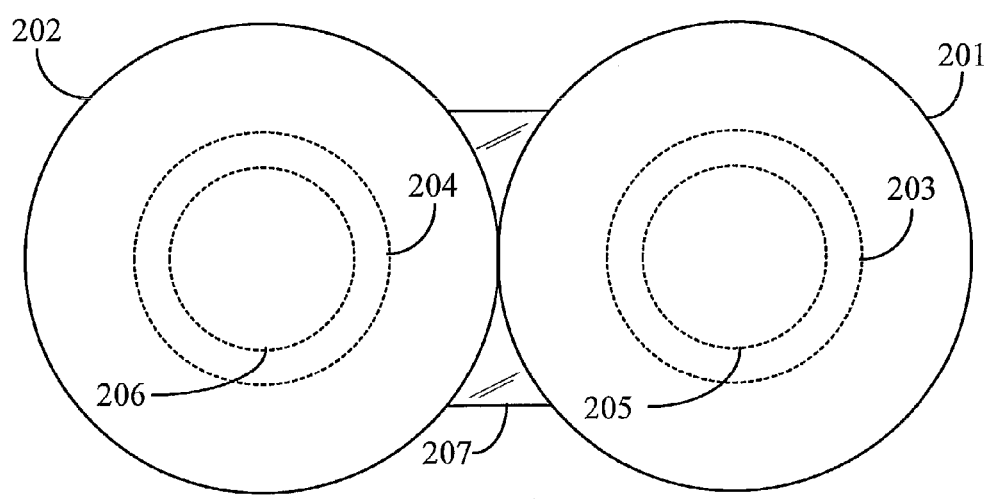
FIG. 2B is a block diagram illustrating a front view of the system of FIG. 2A.

FIG. 2A is a block diagram illustrating component arrangement of a Galilean binocular system 200 adapted for optimal visual capability with minimal control requirements according to an embodiment of the present invention. FIG. 2B is a block diagram illustrating a front view of system 200 of FIG. 2A. Referring now to FIG. 2A, system 200 is adapted according to an embodiment of the present invention to optimize the field of view such that manual eye separation and focus adjustment controls are not required. In a preferred embodiment, the optimization is created through a specific optics arrangement of unique optics lenses.

System 200 includes unique objective lenses formed as objective lens pairs of a lens type termed a meniscus lens. A meniscus lens is a lens that assumes a crescent shape having one concave surface and one convex surface opposite the concave surface. In a preferred embodiment, an objective pair 201 is provided corresponding to a user's left eye 103 and an objective pair 202 corresponding with a user's right eye is provided. Each meniscus pair comprises 2 each "positive" meniscus lenses that when stacked as an objective pair, promote a very short focal length. In a preferred embodiment, the lenses are stacked concentrically with the convex side of each lens in the pair facing away from the user. Each meniscus lens may be, in a preferred embodiment, molded of acrylic or other suitable optical plastics. The lenses in pairs 201 and 202 are held relatively thin in molding relative to overall diameter of those lenses. The lenses in pairs 201 and 202 may be as large as 2.5 inches in diameter in one preferred embodiment; however they are approximately 2.400 inches in diameter in this example. The typical human eye separation is about 2.5 inches so a 1.25-inch eye separation half-distance emerging from the center of the nose bridge corresponds substantially to the center of each lens pair.

In a preferred embodiment, each lens in objective pair 201 and objective pair 202 has a minimal center-to edge thickness variation thereby lending to an economical molding process and supporting lightweight construction. The provision of objective pairs 201 and 202 in system 200 obfuscates the need for typical achromatic doublets described further above with respect to FIG. 1A and FIG. 1B. The exact thickness (measured at center) of a meniscus lens of pair 201 or pair 202 may vary slightly, but a preferred thickness for the present example is approximately 0.45 inches for the top lens in each pair and 0.35 inches for the bottom lens in each pair. Also in a preferred embodiment, the lenses in a pair are spaced apart at a preferred gap of approximately 0.050 inches as measured from the back surface center point of the top lens in a pair to the front surface center point of the adjacent lens in the pair.

Binocular system 200 further includes a unique field lens, two of which are provided in this embodiment and which are strategically located in a preferred arrangement behind each of the objective pairs 201 and 202. Field lens 203 is provided in conjunction with the left side of a binocular system in this optics arrangement. Field lens 204 is provided in conjunction with the right side of a binocular system in this optics arrangement. The field of view of the specific arrangement is illustrated in this example as a conical solid boundary extending from objective pairs 201 and 202, extending through field lenses 203 and 204 and into the ocular lenses of the system. The ocular lenses, also termed "eye lenses" are illustrated herein as an ocular or eye lens 205 associated with the left-side optics and an ocular or eye lens 206 associated with the right-side optics of system 200.

Field lenses 203 and 204 are also meniscus lenses as described above with respect to objective pairs 201 and 202. In a preferred embodiment field lenses 203 and 204 are positioned in line with and just in front of eye lenses 205 and 206 respectively. Galilean binocular systems of prior art do not contain field lenses. It is known that a field lens has been used in some standard telescopic devices that produce an internal image; however the use of field lenses in Galilean type binocular systems that produce no internal image is unique. The field lenses 203 and 204 are adapted in a preferred embodiment, to capture more light from objective pairs 201 and 202 respectively, and to direct all of that light gathered into eye lenses 205 and 206 respectively. Field lenses 203 and 204 may be manufactured of a borosilicate crown glass or other rigid lens materials.

The addition of field lenses 203 and 204 within system 200 provides a much brighter image as viewed by the user's eyes, and one that has a much better contrast than is possible with a standard Galilean binocular system. In a preferred embodiment, the diameter of field lenses 203 and 204 is approximately 1.350 inches and center thickness measures about 0.300 inches. In this example, lenses 203 and 204 are spaced about 4.070 inches from the back surface of corresponding objective pairs 201 and 202 respectively. Eye lenses 205 and 206 may be formed of a high optical index polycarbonate plastic or, in one embodiment, of flint glass material. In a polycarbonate version of lenses 205 and 206, the surface of each lens facing away from the user is slightly convex while the backside of the system is notably concave. In the flint glass version, the front surface of each lens facing away from the user may be slightly concave. Lenses 205 and 206 produce a very short focal length. Further, they are strongly negative producing much more optical magnification power than standard Galilean systems. In a preferred embodiment, lenses 205 and 206 are manufactured from a high optical index polycarbonate plastic, which enables chromatic correction.

The shape of the lenses in this example and the provision of the described lenses within system 200 enable system 200 to be fixed with respect to eye separation. This is illustrated in this example by a bridge plate 207 connecting the left and right optics of system 200, presumably via attachment between the enclosing barrels of the system. Similarly, the arrangement of the optics in system 200 obfuscates the need to focus in on an object being viewed. More particularly, the combination of unique lenses in the described arrangement produces significantly large exit beams illustrated herein as left exit beam 208 and right exit beam 209. Exit beams 208 and 209 are significantly wider than beams 112 and 113 illustrated in FIG. 1A. Accordingly, a user may vary eye placement laterally and forward and rearward to a lager extent and still receive an optimized view of an object sighted through system 200. A user may, for example, wear a pair of eyeglasses or sunglasses and still use system 200 without being required to remove his or her glasses in order to obtain a good view.

Referring now to FIG. 2B, objective pairs 201 and 202, field lenses 203 and 204, and eye lenses 205 and 206 are substantially concentric in alignment. Objective pairs 201 and 202 are positive or convergent lenses producing a short positive focal length. Field lenses 203 and 204 are also positive or convergent lenses producing a short positive focal length. Lenses 205 and 206 are strongly negative or divergent producing a very short negative focal length.

Figure 3B:
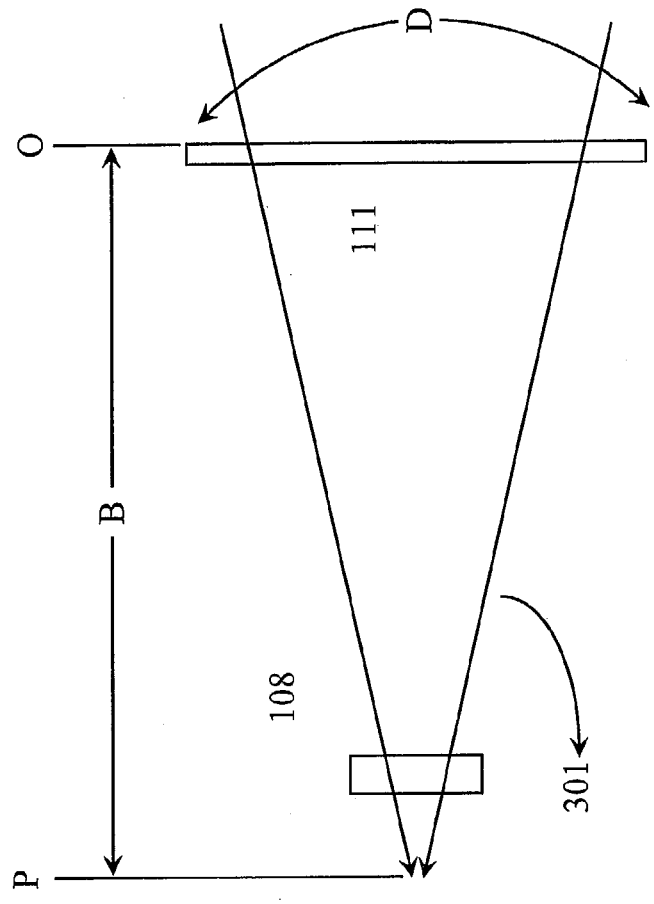
FIG. 3B is a block diagram illustrating typical lens arrangement of a Galilean system according to prior art.
Figure 3A:
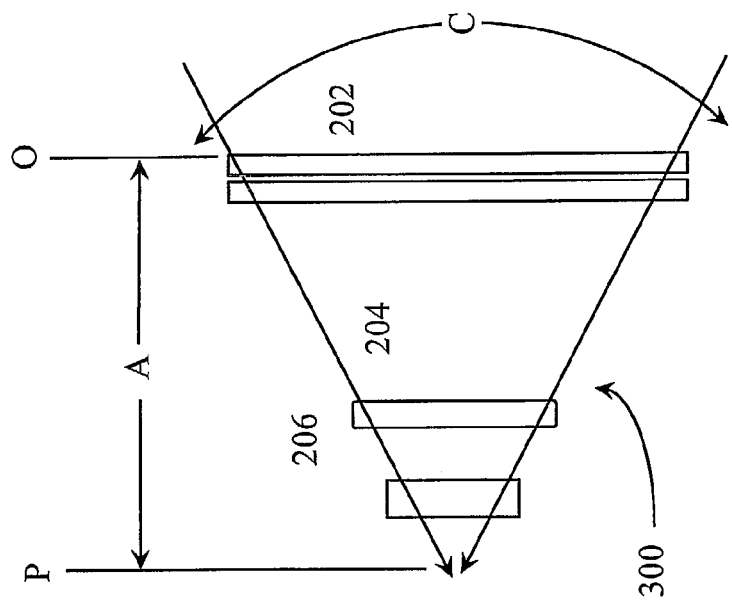
FIG. 3A is a block diagram illustrating lens arrangement according to an embodiment of the present invention.

FIG. 3A is a block diagram illustrating a lens arrangement 300 according to an embodiment of the present invention. FIG. 3B is a block diagram illustrating a typical lens arrangement 301 of a Galilean system according to prior art.

Referring now to FIG. 3A, optics arrangement 300 is provided as previously described above for a Galilean type binocular system having no prisms and therefore focusing an image only at the user's eyes. In this example, optics arrangement 300 is analogous to the right-side optics lenses previously described above with respect to FIGS. 2A and 2B. Therefore, the described lenses shall retain their same element numbers and shall not be reintroduced. Lens curvatures representing concave or convex lens surfaces are omitted from this logical view but may be assumed present as previously described. Objective pair 202 consisting of 2 positive meniscus lenses gathers light according to a wide field of view represented herein by a field angle C or the angle at which light traveling radially enters the binocular system and is captured by the objective pair.

Field lens 204 strategically located in front of eye lens 206 functions to further shorten focal length and directs maximum light into eye lens 206 to optimize image brightness and contrast. Shortening the positive focal length of the optics allows the system to be provided a shorter overall length and enabling a more compact and lightweight system. Therefore, angle C is greater than would be provided with a standard Galilean system having a same or similar diameter objective. The choice of lightweight lens materials aids in producing a system of lighter weight. A length A illustrated in this example as a distance between the front objective surface (O) and a user's pupil (P) is significantly shortened over typical Galilean optics described in FIG. 3B.

Referring now to FIG. 3B, optics 301 is analogous to the right side optics arrangement in barrel 106 of FIG. 1A above. Achromatic doublet 111 of a same or similar diameter as meniscus pair 202 gathers light at a smaller angle D. Absence of field lens 204 results in a greater distance between the objective (o) and the pupil (P).

FIG. 4A is a block diagram illustrating a lens arrangement 400 analogous to the lens arrangement of FIG. 2A in side view. FIG. 4B is a block diagram illustrating a lens arrangement 403 analogous to the lens arrangement of FIG. 1A in side view.

Referring now to FIG. 4A, a conical light path boundary or viewing field 401 is illustrated in a preferred embodiment passing through meniscus pair 201, field lenses 203 and eye lens 205 focusing an image through pupil or eye 103. It can be seen that meniscus pair 201 and field lens 203 producing shorter focal lengths and strongly negative lens 205 in cooperation produce a wider filed of view 401 at a shorter overall system length than a standard Galilean lens arrangement having a same or similar objective diameter shown in FIG. 4B.

Referring now to FIG. 4B, achromatic doublet 110 of a same or similar diameter as meniscus pair 201 described above produces a much longer focal length resulting in a much longer system length and a smaller overall conical light path or field of view 402.

Figure 5A:
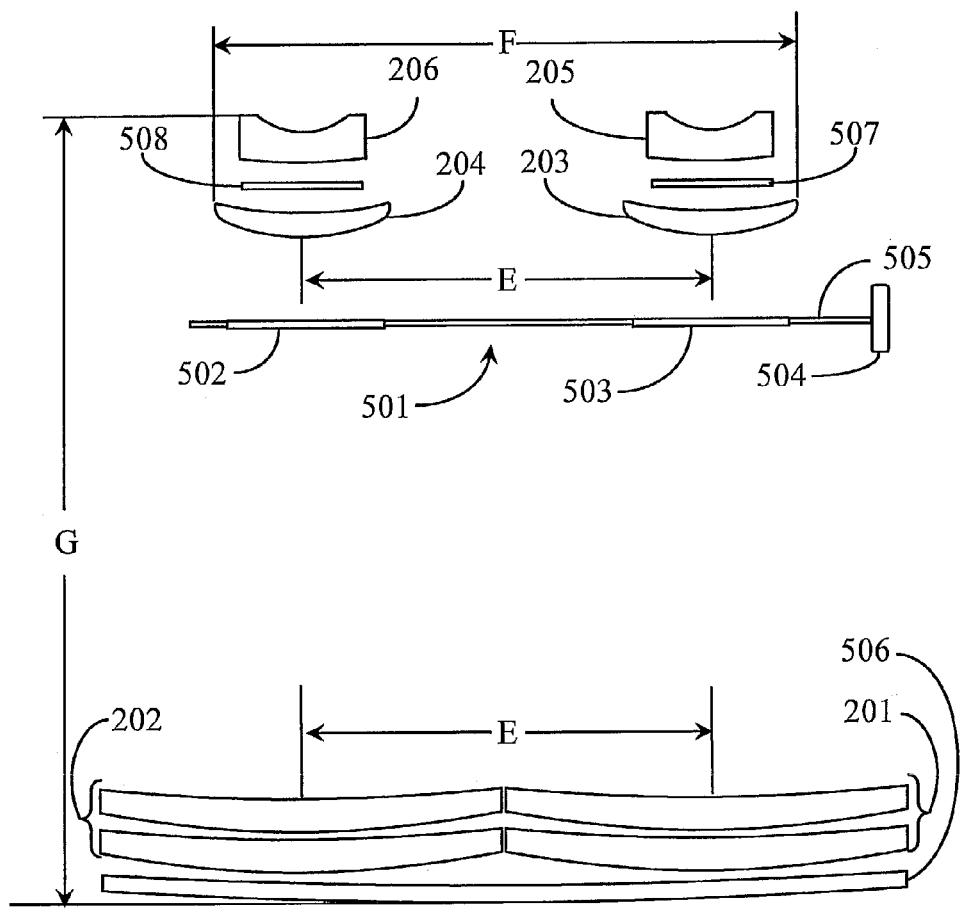
FIG. 5A is a top view of the lens arrangement of FIG. 2A enhanced with absorption and variable color filtering capabilities according to an embodiment of the present invention.
Figure 5B:
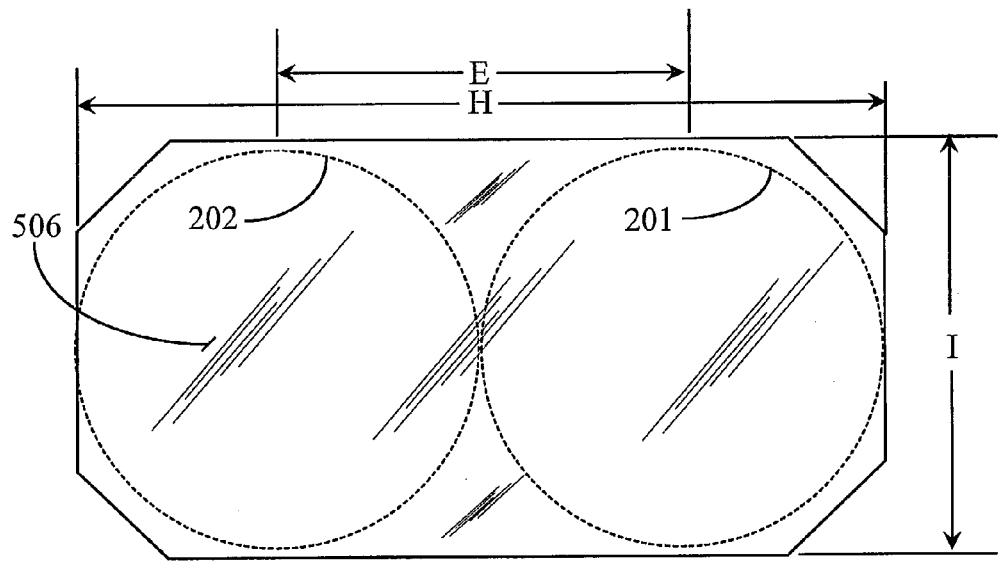
FIG. 5B is a front view of the arrangement of FIG. 5A.

FIG. 5A is a top view of the lens arrangement of FIG. 2A enhanced with absorption and variable color filtering capabilities according to an embodiment of the present invention. FIG. 5B is a front view of the arrangement of FIG. 5A.

Referring now to FIG. 5A, a color absorption filtering substrate 506 is provided to reside directly in front of meniscus pairs 201 and 202. Absorption filter 506 is adapted to filter out certain colors from light passing there through in order to enhance color contrast of an image being viewed. In this example, objective filter 506 is a fixed filter substrate that may be provided of a high-grade optical glass, plastic or similar plastic substrate. Filter 506 may be provided as a color enhancing plastic element as shown in this preferred embodiment, or as an optical multi-layered coating provided on a lens element or separate substrate. In one embodiment, filter 506 may be an absorption filter Acrolite™ 430-7 "yellow" filter, although this should not be construed as a limitation as other filters are certainly available and may be used. The human eye responds better to greens and yellows so a good initial color contrast may be obtained using a filter that filters out more of the blues. In a preferred embodiment objective filter 506 doubles as a protective element for meniscus pairs 201 and 202.

In one embodiment of the present invention a variable color contrast filtering mechanism 501 is provided and strategically implemented just in front of field lenses 203 and 204. Mechanism 501 comprises a shaft 505 to which a turn wheel 504 is mounted. Shaft 505 may be a stainless steel or aluminum shaft rotably mounted within the binocular system, wheel 504 is made accessible to a user on the outside of the binocular housing.

Shaft 505 supports two filter substrates 502 and 503 strategically mounted in a parallel relationship to each other and spaced in accordance with the centerline axis' of filed lenses 204 and 203 respectively. In this view, substrates 502 and 503 are in a perpendicular position with respect to the longitudinal or "line of sight" axis of the supporting binocular system. Substrates 503 and 502 are each coated with multiple layers of color controlling film in one embodiment. Substrates 503 and 502 may be formed of a high-grade optical glass or plastic.

In a preferred embodiment where multiple layers of color controlling film are used, the film coating on substrates 502 and 503 is angularly sensitive to varying angles of the incidence of incoming light such that if device 501 is turned away from perpendicular relevant to the line of sight, the color transmission properties of the device vary accordingly. In one embodiment, substrates 502 and 503 may instead be coated lens elements having substantially more thickness than a typical substrate.

In another embodiment of the invention fixed absorption filters may be provided between field lenses 203 and 204 and eye lenses 205 and 206. A left filter 507 is illustrated in a fixed position between lenses 203 and 205. A right filter 508 is illustrated in a fixed position between lenses 204 and 206. Filters 507 and 508 may be similar in construction material to objective filter 506. A high-grade glass or plastic is suitable. In one embodiment, Filters 507 and 508 are multi-layered color controlling substrates. Filters 507 and 508 may be used in combination with or in place of filter 506.

In this particular embodiment, the Galilean system enhanced with field lenses 203 and 204, meniscus pairs 201 and 202, and negative eye lenses 205 and 206, assumes a dimensional profile that is optimized for a sports binocular system. For example, a system length G is approximately 6 inches. Eye separation distance E is approximately 2.5 inches. A distance F measured from the distal edges of the field lenses is approximately 4.0 inches.

Referring now to FIG. 5B, the overall preferred width of the enhanced Galilean system is 5.0 inches. The overall height of the system is approximately 2.6 inches. Thus the enhancements produced by the unique lens arrangement produce a lighter and more compact system having a wider and more accessible field of view.

Figure 5C:
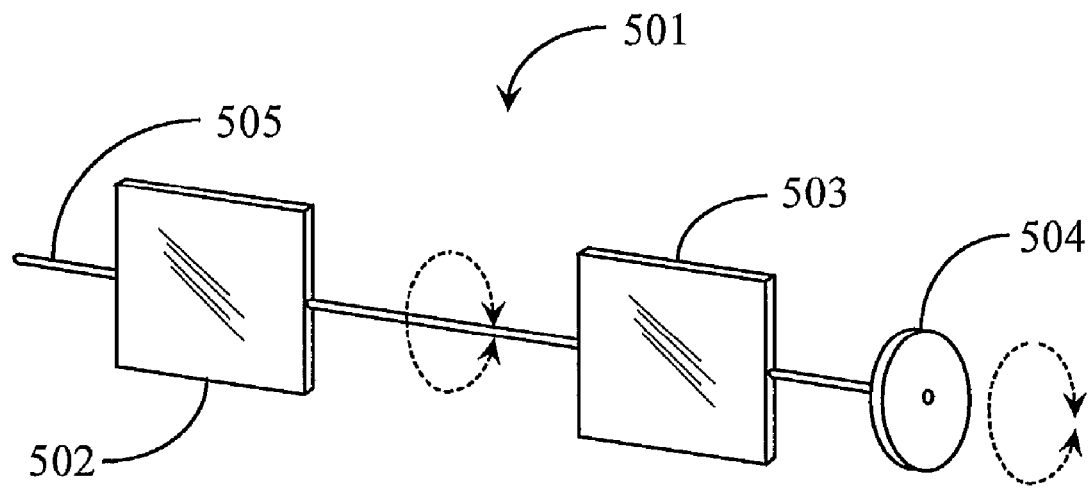
FIG. 5C is a perspective view of the variable color contrast control device of FIG. 5A.
Figure 5D:
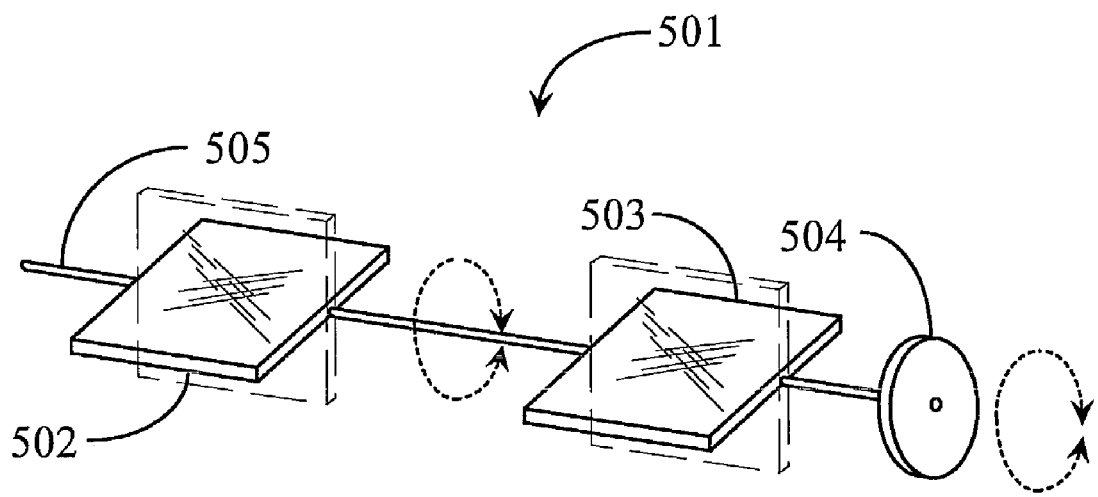
FIG. 5D is a perspective view of the device of FIG. 5A rotated approximately 22 degrees from perpendicular.

FIG. 5C is a perspective view of variable color contrast device 501 of FIG. 5A. FIG. 5D is a perspective view of device 501 rotated approximately 22 degrees from perpendicular.

Referring now to FIG. 5C, turn wheel 505 may be manipulated by a user to vary the angle from perpendicular for substrates 503 and 502 by turning shaft 505 in either a front or backwards direction as indicated by the turn arrow illustrated. When perpendicular, a set or fixed color spectrum is transmitted.

Referring now to FIG. 5D, device 501 is turned away from perpendicular to approximately 22 degrees providing a completely different color spectrum to be transmitted. The exact rate of change for color control may vary according to the film layers provided. In a preferred embodiment, wheel 504 and shaft 505 are mounted such that the rate of color change is controlled in a graduating manner by degree. The mounting of device 501 is accomplished using frictional bearings or other friction or pressure housings about shaft 505 so that the substrates remain fixed in any turned position without being freely rotatable. More detail regarding the color absorption properties of filter 506 and of variable filter device 501 is provided later in this specification.

Figure 6A:
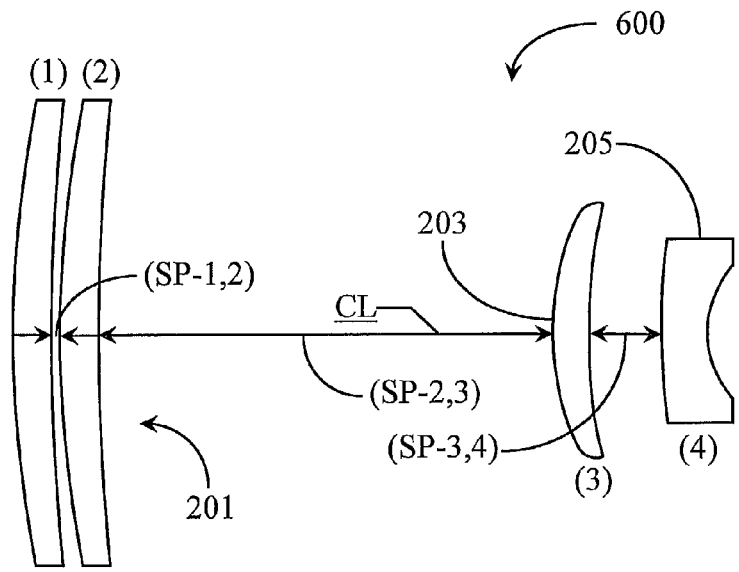
FIG. 6A is a side view of an enhanced lens arrangement for a Galilean type binocular system according to an embodiment of the present invention.
Figure 6B:
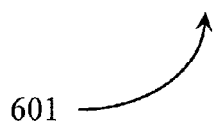
FIG. 6B is a table 601 listing lens specifications for lens of FIG. 6A according to a preferred embodiment.

FIG. 6A is a side view of an enhanced lens arrangement 600 for a Galilean type binocular system according to an embodiment of the present invention. FIG. 6B is a table 601 listing lens specifications according to a preferred embodiment.

Referring now to FIG. 6A, meniscus pair 201 is further labeled as objective meniscus lens (1) and objective meniscus lens (2) for the purpose of differentiating between the two. Field lens 203 is further identified as field lens (3) and eye lens 205 is further identified herein as lens (4). The space between lens (1) and lens (2) in this example is (SP-1,2) measured at the horizontal center of the pair. The space between lens (2) and lens (3) is (SP-2,3) measured from the horizontal center of the lenses. Finally, the space between lens (3) and lens (4) is (SP-3,4) measured at the horizontal center of the lenses.

Referring now to FIG. 6B table 601, the specifications are listed under columns labeled, from left to right, front radius, back radius, center thickness (CT), space, material, and diameter. In provision of optimized sports binocular in accordance with the present invention, empirical testing and result taking provides the preferred specifications listed in table 601 for the lenses in arrangement 600 of FIG. 6A. However, these specifications should not be construed as limiting as the same lens arrangement may be provided with lenses that vary from the stated specifications, which still produce an optimized system wherein focusing and eye separation adjustments are not required.

Referring now to table 601, in a preferred embodiment, objective lens (1) has a front convex (CX) radius of approximately 4.62 inches. Lens (1) has a back concave (CC) radius of approximately 10.01 inches. Lens (1) has a center thickness of approximately 0.45 inches. The spacing between lens (1) and lens (2) or (SP-1,2) of FIG. 6A is approximately 0.05 inches. The preferred material for lens (1) is acrylic. The preferred diameter is 2.4 inches.

Objective lens (2) has a front convex (CX) radius of approximately 3.79 inches. Lens (2) has a back concave (CC) radius of approximately 4.63 inches. Lens (2) has a center thickness of approximately 0.35 inches. The spacing between lens (2) and lens (3) or (SP-2,3) of FIG. 6A is approximately 4.07 inches. The preferred material for lens (2) is acrylic. The preferred diameter is 2.4 inches.

Field lens (3) has a front convex (CX) radius of approximately 0.82 inches. Lens (3) has a back concave (CC) radius of approximately 1.81 inches. Lens (3) has a center thickness of approximately 0.30 inches. The spacing between lens (3) and lens (4) or (SP-3,4) of FIG. 6A is approximately 0.33 inches. The preferred material for lens (3) is borosilicate (BS) Crown. The preferred diameter is 1.35 inches.

Eye lens (4) has a front convex (CX) radius of approximately 15.79 inches. Lens (4) has a back concave (CC) radius of approximately 0.65 inches. Lens (4) has a center thickness of approximately 0.13 inches. The preferred material for lens (4) is a high-grade polycarbonate, however flint glass may also be used. The preferred diameter is 1.00 inches. If lens (4) were provided in flint glass material, the front radius would be slightly concave rather than convex.

Figure 7A:
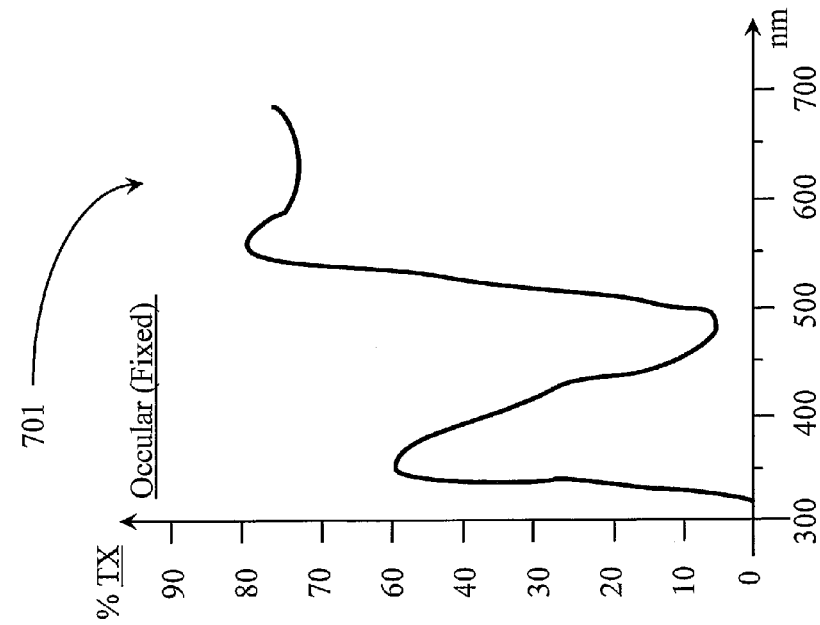
FIG. 7A is a graph illustrating color absorption of the objective filter of FIG. 5A.

FIG. 7A is a graph 700 illustrating color absorption of objective filter 506 of FIG. 5A. In color theory, the color range that the human eye can see is generally known and documented in terms of wavelengths of light measured in nanometers (nm). Generally speaking at the range of 400 to 450 nm, the color is ultra (violet) light. From 450 to 500 nm, blue to cyan (lighter blues) are dominant. From 500 to 600 nm, green light is dominant. At 600 to about 650 nm yellow to orange is dominant. From 650 to 700 nm, orange to reds are dominant. Beyond 700 nm, reds turn to infrareds that are not visible.

Referring now to graph 700, at 400 nm there is no visible color, however between 400 to 500 nm, the absorption filter 506 transmits very little blue light as might be the case of an Acrolite™ "yellow" filter described further above. Between 500 and 600 nm, the filter allows up to 80% greens and yellows. Between 600 and 700 m, the filter allows up to 90% of the orange and reds. As described further above with reference to FIG. 5A, the human eye responds more to yellows and greens and less to blues and reds. Therefore, the effect of fixed filter 506 is an appearance of more of a bright greenish yellow when viewing the image providing better color contrast. As illustrated in FIG. 5A, a fixed color filter might also be provided between the field lenses and the eye lenses. Such a filter could be an absorption filter or a multi-layered, fixed substrate filter that may be used in the binocular system in addition to or in place of filter 506. One good example of such a filter might be a GAMCOLOR™ 395 Golden Sunset filter known to the inventor. Such a filter may be a multi-layered film substrate as described further above.

Figure 7B:
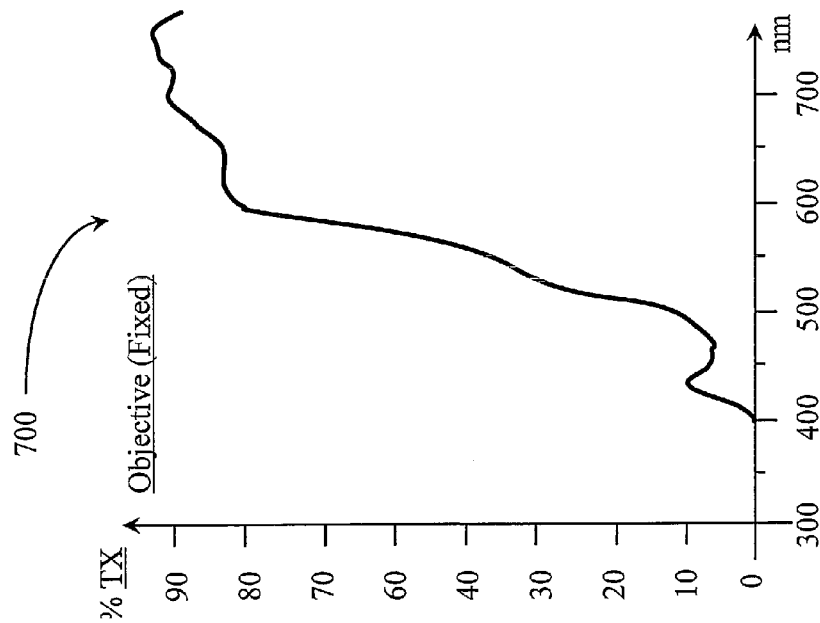
FIG. 7B is a graph illustrating color transmission of a fixed multi-layer substrate filter placed between the field lens and eye lens of FIG. 5A according to an embodiment of the present invention.

FIG. 7B is a graph 701 illustrating color transmission spectrum of a fixed multi-layer substrate filter placed between the field lens and eye lens according to an embodiment of the present invention. Also referred to as an ocular fixed filter, graph 701 illustrating multi-layer film properties transmits only about 10% blue at 450 nm similar to the objective filter. The ocular filter transmits about 80% green at 550 nm. The ocular filter transmits less yellows and reds than the objective filter. Comparatively speaking, both filters provide similar contrast enhancement by themselves. They may also be used in conjunction with each other.

Figure 7C:
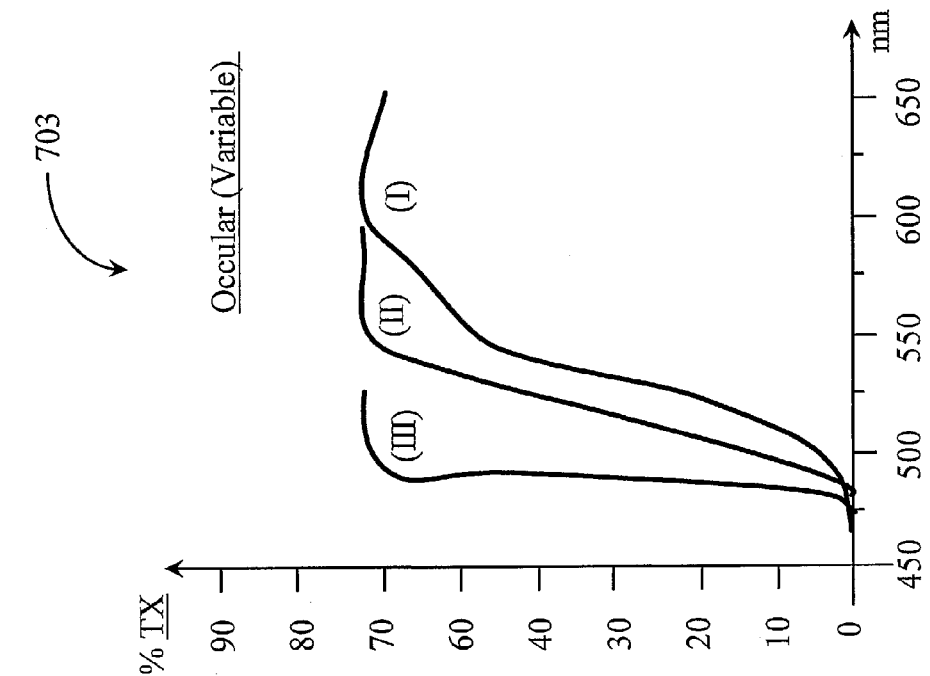
FIG. 7C is a graph illustrating a comparison between a standard absorption filter and a multi-layered Dichroic type filter according to an embodiment of the present invention.

FIG. 7C is a graph illustrating a comparison between a standard absorption filter and a multi-layered Dichroic type filter according to an embodiment of the present invention.

The absorption filter used as an objective filter transmits very little if any blue light at 450 nm, the beginning of the visible wavelength. At 500 nm, the cyan and green shoots up to 90% transmission between 500 and 550 nm. Likewise, the filter allows over 90% yellows and reds after 600 nms. In contrast, the multi-layered interference filter allows about 10% blue light at 450 nm. Transmission of blue decreases to less than 5% at 475 nm. Greens are transmitted sharply up to 80% between 500 and 600 nms (beginning of yellow spectrum). After 600 nm, the yellows drop to about 75% as well as orange and reds. It is clear that the multi-layered eye lens filter can be used as a fixed filter successfully in combination with or in place of the objective interference filter. However, the multi-layered filter may be provided as a variable filter as described above in FIG. 5A with respect to color variable filter mechanism 501 placed just in front of the field lenses 203 and 204. A graph showing color transmission variance with respect to substrate location is provided below.

Figure 7D:
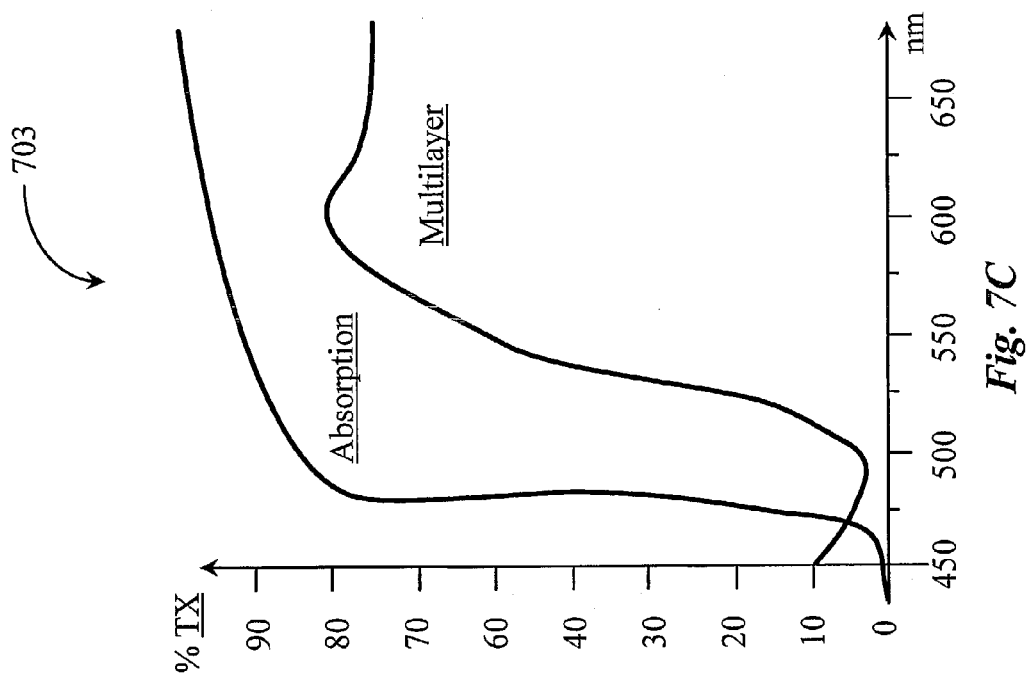
FIG. 7D is a graph illustrating variable color transmission control by an angularly variable multi-layered filter according to an embodiment of the present invention used in combination with a fixed absorption filter.

FIG. 7D is a graph illustrating variable color transmission of a variable multi-layered filter according to an embodiment of the present invention used in combination with a fixed absorption filter. The represented curves on graph 7D represent three different cases where both filters are used, but where the variable filter is subsequently caused to rotate off perpendicular by turning wheel 504 of mechanism 501 described above in FIGS. 5C and 5D.

In curve (I), both the absorption filter and the multi-layered filter are perpendicular to the line of sight. In curve (I) there is 70% yellow at 600 nm, about 40% green and about 0% blue at 450 nm. The appearance for the user would be like looking through the multi-layered interference eye lens filter alone as in FIG. 7C while wearing gray sunglasses. This is because the interference filter does not transmit shorter wavelengths transmitted by the front absorption filter.

Curve (II) illustrates the use of both a fixed absorption filter as described above with a multi-layered substrate filter, with the variable filter tilted about 22.5 degrees off of perpendicular. As can be seen by the plotted curve, there is a much higher percentage of greens and on into yellows at 600 nm. At this color range, the human eye is more sensitive. The appearance for a user then is a color contrast that reveals strikingly more bright greens and yellows. The former reddish cast of curve (I) is completely removed by the rotation of the substrate thus producing curve (II).

Further rotation of the variable color multi-layered, filtering mechanism 501 results in curve (III), at about 45 degrees rotation, where the color effects of multi-layer substrate effectively disappear. The color effect is as though the user is only looking through the objective absorption filter 506 of FIG. 5A. The overall brightness of the image is diminished only slightly. Curve (III) can be compared with the absorption curve in FIG. 7C, curve III having similar spectral range but less brightness. Importantly, the invention using mechanism 501 has been found to provide remarkable control over color contrast just by turning the wheel 504 slightly off perpendicular and this provides the user with an enjoyable viewing experience.

Figure 7E:
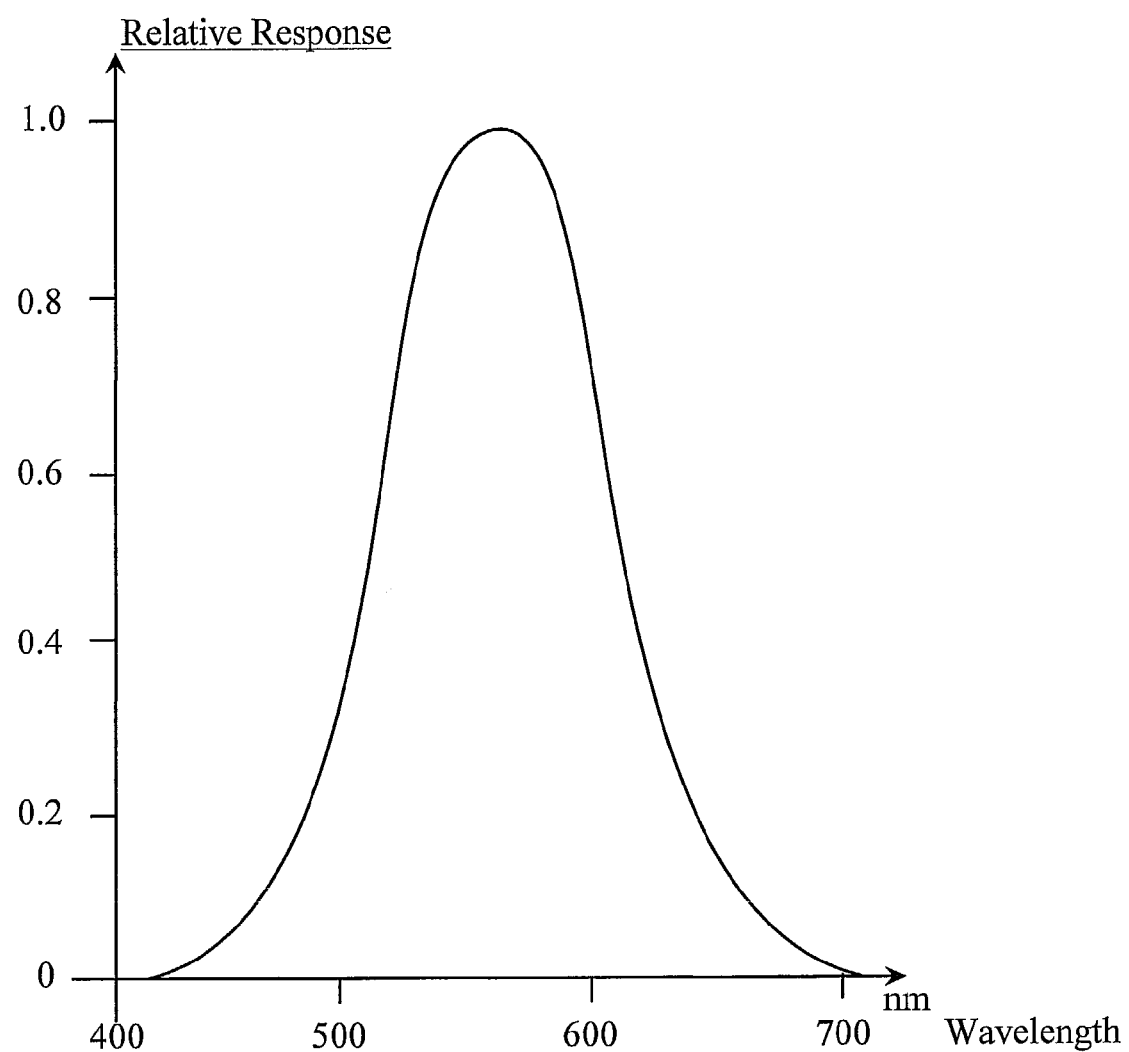
FIG. 7E is a graph illustrating a normal color sensitivity response curve of the human eye viewed in daylight.

FIG. 7E is a graph illustrating the normal color sensitivity response curve of the human eye during daylight. It may be appreciated by the skilled artisan that the human eye normally is sensitive to certain colors over certain wavelengths over a fairly constant curve represented in this view. At about 425 nm the sensitivity rises sharply to a peak and then drops off sharply relative to the visible colors of the spectrum, ultra violet and infrared not being visible.

It is noted herein that in one embodiment of the invention already described, there is at least one filter which is essentially fixed or otherwise unchanging relative to the color spectrum allowed to pass through it while one or more other filters are caused to pass a changing spectrum by change of angle or position. Relative to this particular exemplary embodiment, the bell shaped response curve of the human eye relative to the visible color spectrum as shown here in FIG. 7E is utilized in accordance with the invention to leverage the color contrast of colors viewed by manipulating at least one angle or position-sensitive filter.

One with skill in the art will clearly visualize upon inspection of the human eye response curve of FIG. 7E, and then comparing it to the response curve of a long wave pass filter, such as the multiplayer interference curve of FIG. 7C that a result is a marked change in color contrast perceived by the human eye. It is further apparent in the embodiment just described that filters passing a fixed color spectrum are utilized in sequence with the movable variable filters to limit the passage of contrast impeding wavelengths, for example blue wavelengths, thus making those wavelengths not limited by the variable filter appear even brighter to the eye. In implementing the invention according to the particular embodiment, long pass wave filters or short pass wave filters may be used.

Figure 8A:
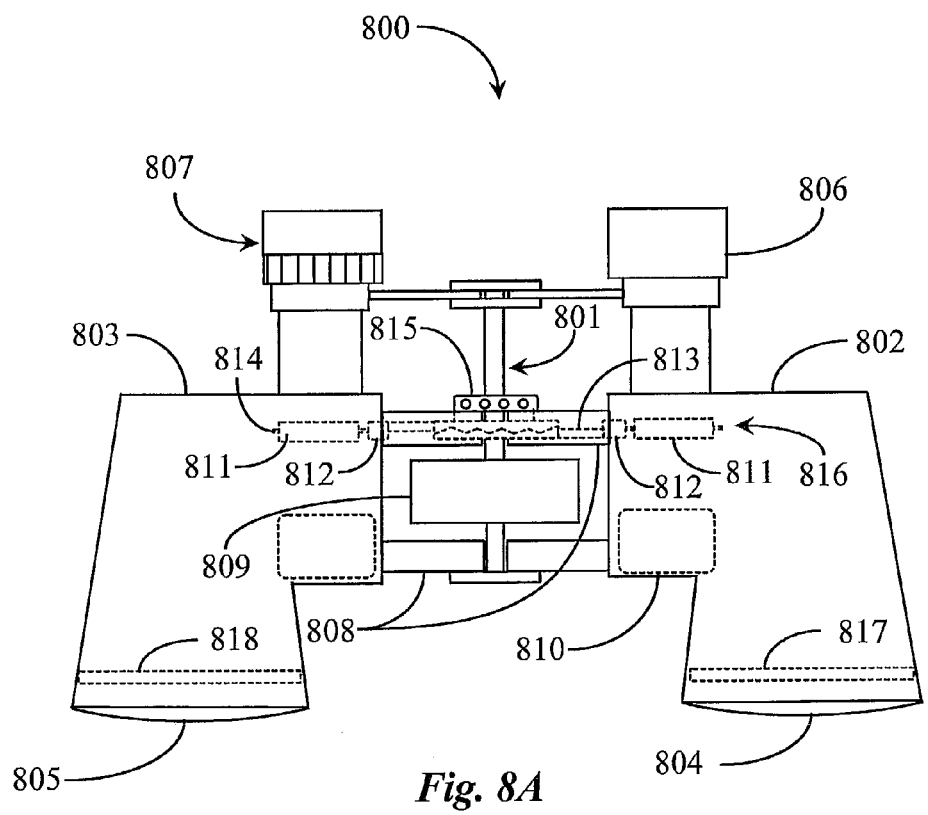
FIG. 8A is a top view of a binocular system having prisms and focusing an internal image enhanced with variable color contrast capability according to an embodiment of the present invention.

FIG. 8A is a top view of a binocular system 800 having prisms 810 for focusing an internal image enhanced with variable color contrast capability according to an embodiment of the present invention. System 800, unlike Galilean system 100 of FIG. 1A has internal prisms for providing an image internally that the user can see through the ocular lenses of the system. System 800 has a left barrel 802 and a right barrel 803. Barrels 802 and 803 house prisms 810 and objective lenses 804 and 805 respectively. Barrels 802 and 803 also support eyepiece barrels 806 and 807 that serve as housings for ocular lenses (not illustrated). Barrels 802 and 803 are held together in a substantially parallel relationship via connecting wings 808 rotably mounted to a central shaft 801.

A focus wheel 809 provides frontward and rearward movement of ocular eyepieces contained within eyepiece barrels 806 and 807. Barrel 807 has a focus adjustment wheel for adjusting focus to a user's particular eyesight capabilities typical of prism bearing binocular systems. System 800 must be adjusted for eye separation and must be focused accordingly with sighting an object.

In one embodiment of the present invention, objective color filters may be provided and are illustrated in this example as a left side objective absorption filter 817 and a right side objective absorption filter 818. In this example, objective filters 817 and 818 are fixed in place and work to filter out blue light similar to objective filter 506 described further above with respect to FIG. 5A. Also provided within system 800 is a variable color control mechanism 816. Mechanism 816 comprises multi-layered color interference filter cells 811 held spaced apart and in substantially parallel relationship on separate shafts 814. Cells 812 may be coated lens elements or supporting rings filled with a multi-layered substrate. Shafts 814 are each affixed to geared wheels 812 having gear teeth arranged on the side opposite the connected shafts. Shafts 814, multi-layered cells 811, and geared wheels 812 encompass separate components of mechanism 816 one each mounted into each barrel of system 800. The mounting is such that each shaft is rotable to an extent; the cells fixed then in a parallel arrangement and in the same plane.

Mechanism 816 has two opposing geared arms 813, one disposed at each side of central shaft 801 such that the geared end of each arm 808 engages each geared portion of wheels 812. Geared arms 813 are in a preferred embodiment, separately affixed or engaged on a thumb lever 815 having an annular portion mounted rotably about central shaft 801. Thumb lever 815 extends upward from shaft 801 so that a portion of the lever is easily accessible to a user holding the binocular system. The user may move lever 815 to the left or right a fixed or limited distance. The distance that lever may be moved in either direction shall be limited only by the motion range that is afforded to the gear teeth on arms 813 when engaging the gear teeth on geared wheels 812. Shafts 814, wheels 812 and thumb lever 815 including arms 813 may be manufactured of steel, aluminum or a rigid plastic.

Figure 8B:
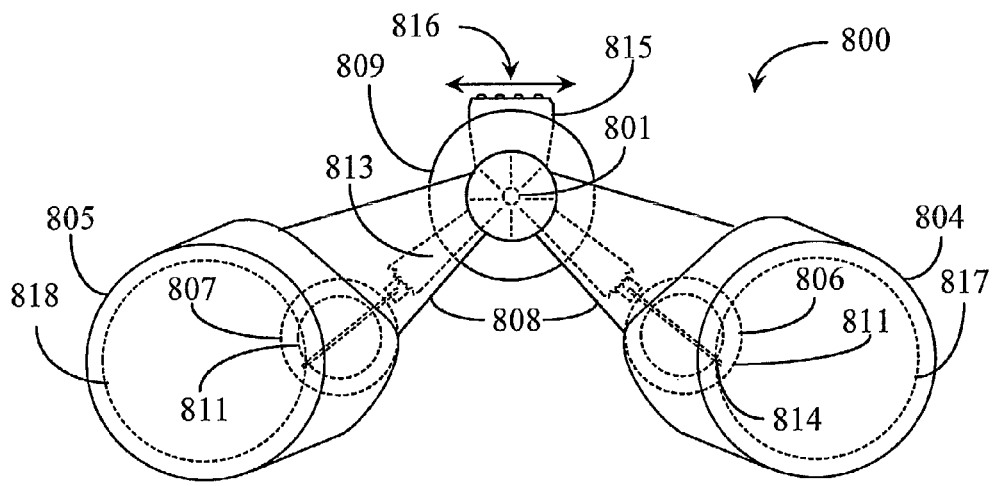
FIG. 8B is a front view of the binocular system of FIG. 8A according to an embodiment of the present invention.

FIG. 8B is a front view of binocular system 800 according to an embodiment of the present invention. Multi-layered cells assume a perpendicular position when thumb lever 815 is positioned at dead center on shaft 801. In this position, cells 811 are substantially concentric with eyepiece tubes 806 and 807 and parallel in a separate plane with respect to ocular lenses. In practice of the invention in this embodiment, a user may urge thumb lever 815 to the left or right causing geared arms 813 to translate motion to engaged geared wheels 812, which in turn causes rotation of shafts 814 and therefore of multi-layered cells 811 such that they deviate one way or the other way from their original perpendicular positions with respect to the line of sight in front of the ocular lenses of the system. Variable color control mechanism 816 may be formed of two separate parts comprising a back half including the thumb lever 815 and one geared arm 813, and a front half comprising essentially the other geared arm.

Annular support halves comprising a pressure washer type arrangement may be mounted on central shaft 801, to which the geared arms may be contiguously formed or otherwise affixed to. A back annular washer half may be contiguously formed with thumb lever 815 and one geared arm while the top washer half may be contiguously formed with the other geared arm. A mechanism so designed may be caused to disengage at the washer "halves", which may be radially geared, so that equal rotation of the geared arms about the axis may occur when mechanism 816 is disengaged and eye separation adjustment is being performed wherein the binocular barrels are rotated radially about axis 801. When eye separation is achieved and fixed, then the mechanism parts described, each supporting one geared arm may be caused to reengage so that proper thumb lever function may be initiated at that position to work both cells 811 simultaneously. Thumb lever 815 may be provided as one contiguous piece with respect to geared arms 813 only if the binocular system is fixed at a specific eye separation amount and otherwise not radially adjustable in this respect. Representation of mechanism 816 formed of two parts is better illustrated later in this specification.

Referring now back to FIG. 8A, geared arms 813 are not symmetrically disposed with respect to lever 815. Rather, the left arm engages geared wheel 812 at the bottom peripheral edge of the wheel while the right arm engages its wheel on the top peripheral edge of the wheel. In this way, multi-layered cells 811 are rotated in the same direction with respect to each other. In another embodiment arms 813 may be symmetrically formed with respect to lever 815 and may engage geared wheels 812 on the same side of the wheels causing cells 811 to rotate the same amount in opposite directions from one another. The color enhancing effect is the same in either case. Multi-layered cells 811 take position far enough behind prisms 810 and far enough in front of the eye lenses that they may conceivably be rotated to a full extent limited of course by the range afforded to the gears.

Figure 9A:
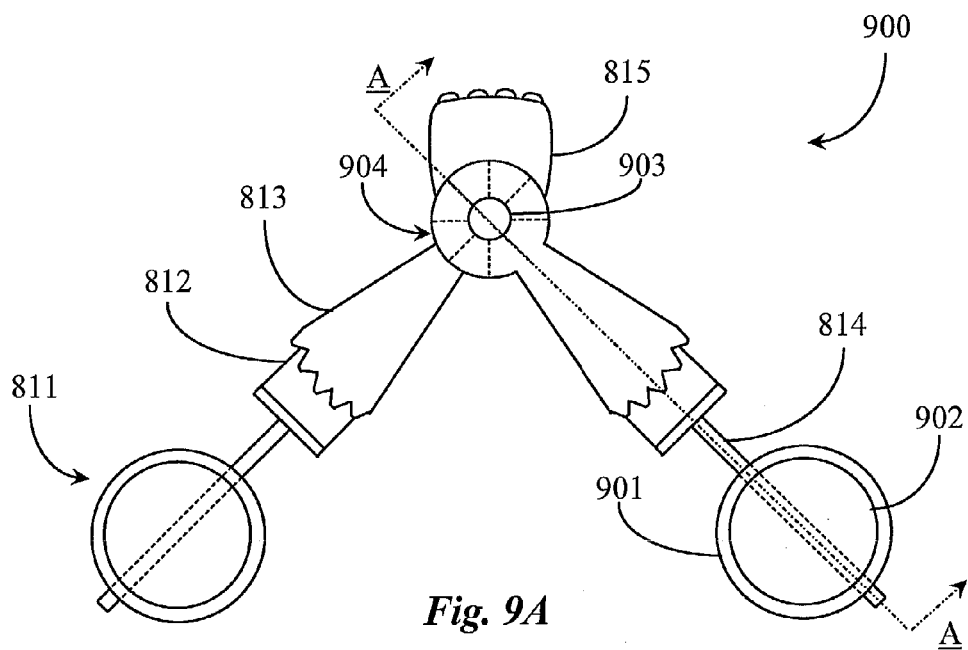
FIG. 9A is a front view of the variable color selection mechanism of FIG. 8A showing greater detail.

FIG. 9A is a front view of variable color selection mechanism 816 of FIG. 8A showing greater detail. Thumb lever 815 has an array of bumps on the accessible surface thereof. The bump array facilitates user comfort and dexterity when urging the lever to the left or to the right. In this view, gear arms 813 are centered and engaged over geared wheels 812. Shafts 814 are mounted in substantially centered positions extending perpendicularly outward from geared wheels 812. Shafts 814 may extend through cells 811 to opposite sides in one embodiment. In another embodiment, they may extend only to rings 901. Rings 901 enclose multi-layer coated lens elements or substrates 902.

In this example, mechanism 816 comprises two separable parts that engage each other via radial geared "half" washers mounted on a central shaft such as shaft 801 of FIG. 8A. An opening 903 is provided for mounting over the shaft in a manner so as not to have much play over the shaft when rotating about the shaft in either direction. One part disposed to the rear in this view includes thumb lever 815 and a right-side geared arm 813. The other part disposed directly over the just described part includes the left-side geared arm. The washer 904 is illustrated as radially geared on its engaging surfaces and may be thus separated, rotated and then re-engaged in accordance with required eye separation adjustment. Once washer 904 is re-engaged (both halves), normal cell rotation via thumb lever 815 may resume. A spring loaded pull pin or sleeve (not illustrated) may be provided at the back portion of mechanism 816 and mounted to the central shaft such as shaft 801 of FIG. 8A. Such a device can be used to disengage mechanism 816 while adjusting for eye separation. An allowable eye separation angle will be one that also coincides with incremental alignment of radial gears on the facing surfaces of washer 904. In this way, the washer may be engaged at a new angle, the separation fixed then until the pin or sleeve is pulled out to readjust eye separation for a different user with a different requirement.

Figure 9B:
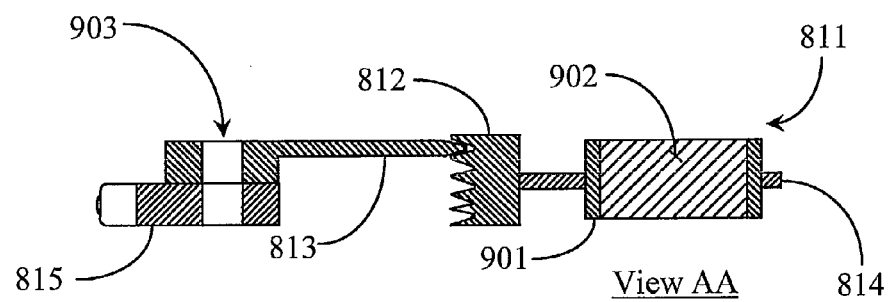
FIG. 9B is a section view of the variable color contrast mechanism of FIG. 9A taken generally along the section line AA.

FIG. 9B is a section view of mechanism 816 of FIG. 9A taken generally along the section line AA. In this view cell 811 includes ring 901 illustrated as enclosing multi-layer film lens or substrate 902. Shaft 814 is centrally affixed to the back of geared wheel 812. Wheel 812 has gear teeth on one side engaged by gear teeth on geared arm 813. Engagement is on the upper peripheral edge of wheel 812. Opening 903 is illustrated through the top portion of mechanism 816 and through the bottom portion partially illustrated. A portion of lever 815 is also illustrated. Radial gears on opposing faces of washer 904 are not illustrated in this view may be assumed to be present.

Figure 9C:
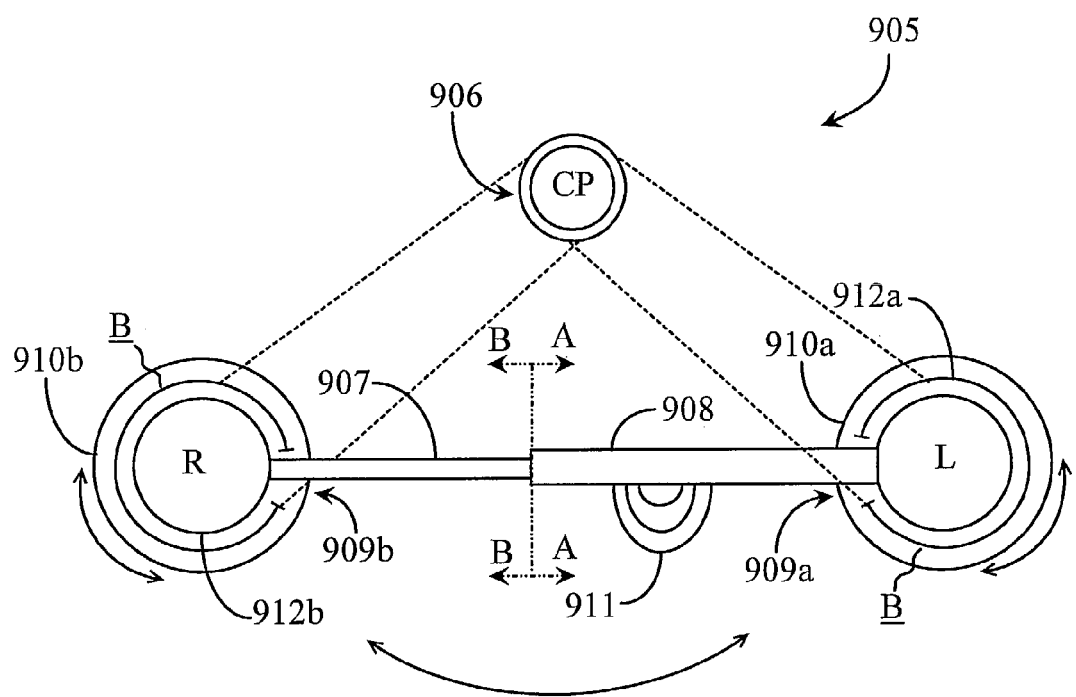
FIG. 9C is a front elevation view of a variable color contrast mechanism according to another embodiment of the present invention.

FIG. 9C is a front elevation view of a variable color contrast mechanism 905 according to another embodiment of the present invention. Color contrast mechanism 905 includes a telescopic arrangement of a splined rod 907, which fits inside a tube 908 having a suitable slot or groove for accommodating the spline feature of rod 907. In this example, rod 907 may be a steel rod, an aluminum rod, or one manufactured of a durable polymer material. Tube 908 may be a steel tube, an aluminum tube, or otherwise a tube made of a durable material like a hard plastic or polymer material.

Tube 908 is supported by a barrel support ring 910a, which is rotably mounted over a left binocular barrel (B). Support ring 910a has an opening placed strategically there through for accommodating the outside diameter of tube 908. Likewise, left barrel B has an elongated opening 909a adapted to accommodate the outside diameter of tube 908 including a specific range beyond the diameter to allow for barrel adjustment for eye separation. A left (L) dichroic filter element 912a is attached at one end of tube 908 and is disposed laterally to within the left barrel and positioned in a substantially concentric relationship to the inside diameter of the barrel. Opening 909a is sufficiently elongated to enable ring 910a to rotate annularly about the left barrel during eye separation adjustment such that filter element 912a remains positioned as described above within the left barrel.

Tube 908 has a thumb lever 911 provided thereon and adapted to enable a user to turn tube 908 about its longitudinal axis thereby also turning dichroic filter element 912a off of perpendicular with respect to a vertical axis of the left barrel. Rod 907 is fitted into tube 908 and may slide within tube 908 a certain extent defined by motion range resulting from an eye separation adjustment of the left and right barrels in an arc about a center pin (CP) 906. The length of elongate opening 909a provided through the left barrel limits the amount of rotation allowed for eye separation.

Rod 907 is splined (not illustrated) so that it may fit inside tube 908 in a manner that when tube 908 is rotated, it translates the same amount of rotation to rod 907. A support ring 910b is provided and is mounted rotable over the right barrel (B). Ring 912b has an opening placed there through adapted to accommodate the outside diameter of rod 907. Rod 907 is not splined along a portion of its length adjacent to ring 910b. The right barrel (B) has an elongated opening 909b provided there through and adapted to accommodate the outside diameter of rod 907 including a range of motion for eye separation as defined above. A right dichroic filter element 912b is fixedly attached to rod 907 and laterally disposed within the right barrel in substantial concentric relationship to the inside diameter of the barrel. Dichroic filer elements 912a and 912b are sufficiently annular in profile and relatively thin in thickness. Elements 912a and 912b may be manufactured of a durable polymer or a glass lens element that is coated to enable dichromatic function of the elements.

The spline arrangement between rod 907 and tube 908 enables both to be rotated together the same amount by a user operating thumb lever 911 forwardly or backwardly with respect to this particular front view of mechanism 905. Dichroic filter elements 912a and 912b are aligned in substantially the same plane by the spline geometry such that they also rotate the same amount in tandem forward or backward. When eye separation adjustment is being performed by physically moving the left and right barrels in toward each other or outward from each other as allowed by CP 906, rod 907 slides in the appropriate direction within tube 908 enabling filter elements 912a and 912b at other end of the mechanism to remain sufficiently concentric within their respective barrels. The elongated slots 909 and 909b accommodate the position change. Once eye separation is achieved, the user may then operate thumb lever 911 in order to rotate filter elements 912a and 912b in tandem in either direction off perpendicular.

Figure 9D:
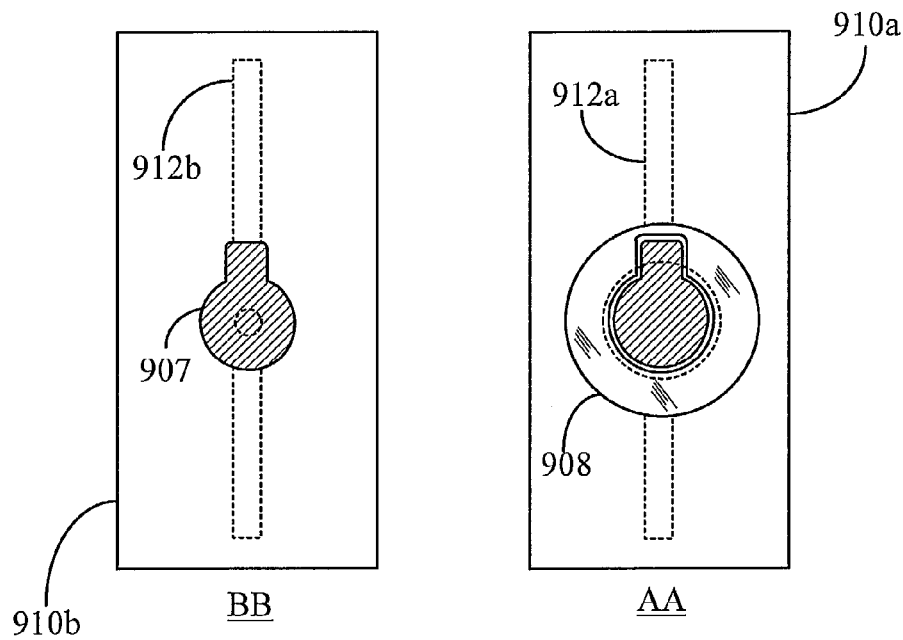
FIG. 9D is a compiled cut view of the rod and tube of the mechanism of FIG. 9C viewed from the vantage of cut lines AA and BB illustrating end profiles of both components.

FIG. 9D is a compiled cut view of rod 907 and tube 908 of the mechanism of FIG. 9C viewed from the vantage of cut lines AA and BB illustrating end profiles of both components. In view BB rod 907 has a spline provided in the form of a rectangular spline. This is not specifically required in order to practice the invention as other spline geometries might be substituted therefore. For example, rod 907 may have a spline formed contiguously therewith along a portion of its length, or the arrangement may be that of a slot and key insert. There are many possibilities.

Rod 907 is attached to filter element 912b in view BB at substantial center, although this is not specifically required as long as some rotation may occur of the filter element within the barrel without being impinged by the inside wall of the barrel. Theoretically, element 912b may be rotated 90 degrees to horizontal although a small angle of rotation is sufficient for the purpose of the present invention. Ring 910b may be mounted over the barrel using bearings and stops to attain rotability about the barrel and to attain the correct linear position on the barrel.

In view AA, Rod 907 is disposed within tube 908. Tube 908 has a slot formed therein for accommodating the spline of rod 907. Tube 908 connects to filter element 912a at substantial center as described above with respect to the junction of rod 907 and filter element 912b. The end of tube 908 that attaches to filter element 912a may be tapered or otherwise formed down from the major OD to better facilitate attachment. It is important to note here that the exact method of attaching filter elements 912a and 912b to respective components 908 and 907 may vary widely and may include such as gluing, welding, or screw-mounting depending at least in part on design.

Figure 9E:
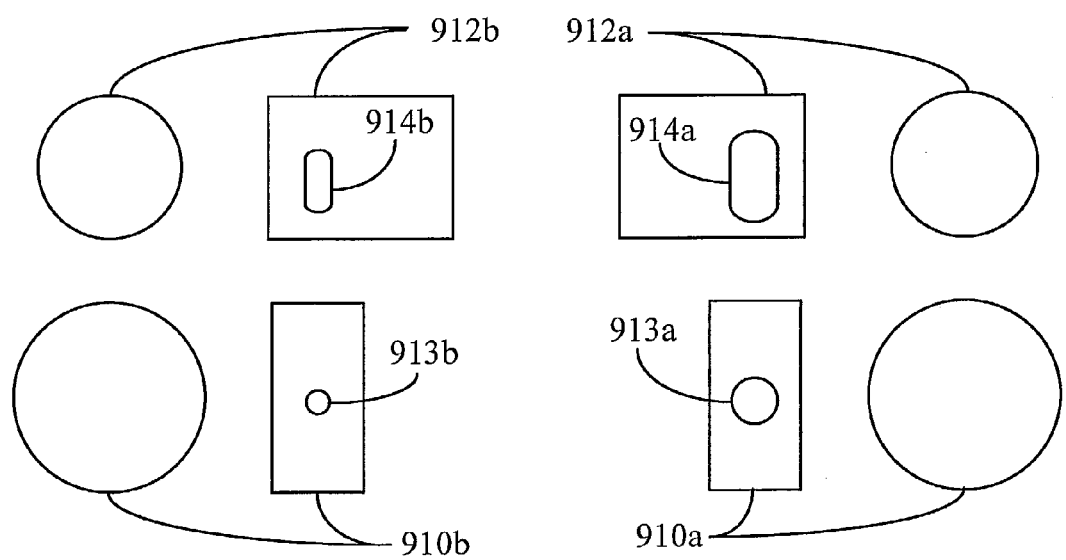
FIG. 9E is a component view of the filter rings of FIG. 9D and of associated barrel sections involved in ring mounting according to an embodiment of the present invention.

FIG. 9E is a component view of filter rings 910a and 910b of FIG. 9D and of associated barrel sections involved in ring mounting according to an embodiment of the present invention. Support ring 910a has an opening 913a provided through one wall. Opening 913a is adapted to accommodate the outside diameter of tube 908 described earlier. Ring 910b has opening 913b provided through one wall and adapted to accommodate the outside diameter of rod 907. Rings 910a and 910b are illustrated in associated front views logically showing outside diameter only.

Barrels 912a and 912b are similarly illustrated herein with openings 914a and 914b. Opening 914a is adapted as a wider opening for tube 908 than opening 914b, which is adapted for rod 907. The outside diameter references of barrel portions 912a and 912b are illustrated in this view.

Figure 9F:
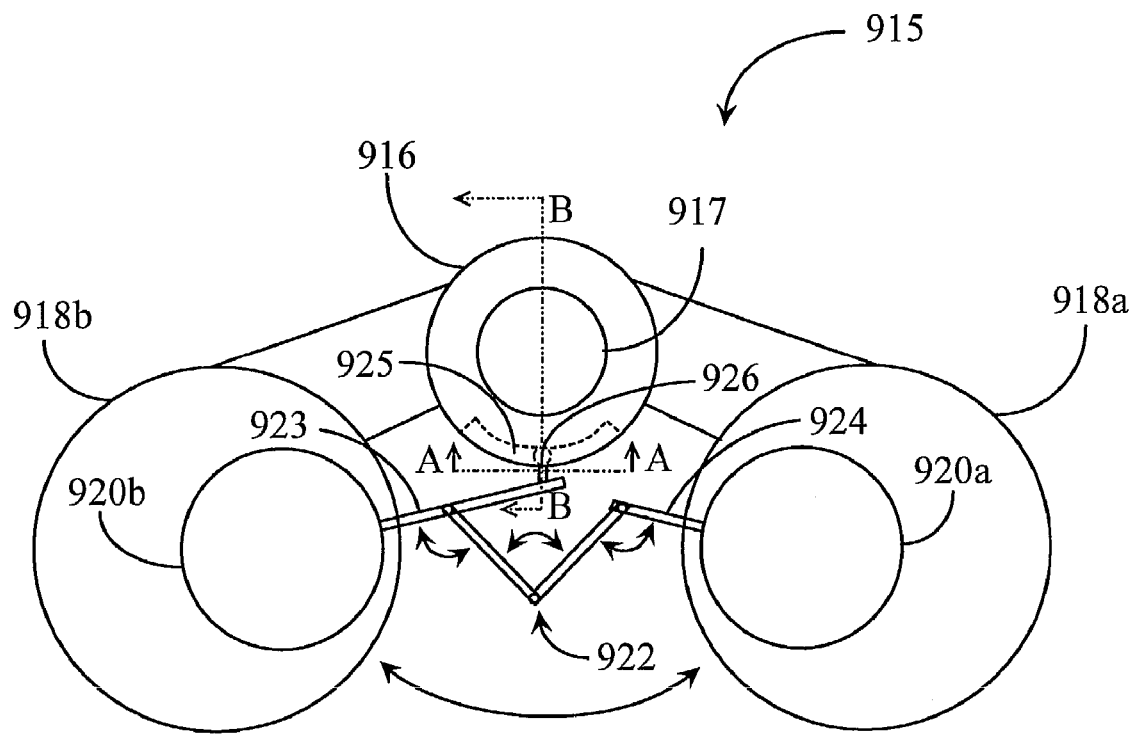
FIG. 9F is a front view of a variable color contrast mechanism according to another embodiment of the present invention.

FIG. 9F is a front view of a variable color contrast mechanism 915 according to another embodiment of the present invention. Mechanism 915 may be provided to a Galilean or prism bearing binocular as described further above with respect to mechanism 905 of FIG. 9C. Mechanism 915 is controlled by a rotation wheel 916 mounted over a central binocular pivot shaft 917 adjacent to and in front of a focus wheel (not illustrated). In this particular exemplary embodiment, a left binocular barrel 918a and a right binocular barrel 918b are illustrated and are adjustable for eye separation as evidenced by a double arrow arc placed beneath the illustration. Dichroic substrates 920A and 920b are illustrated in position within barrels 918a and 918b respectively. A scissor assembly 922 connects substrates 920a and 920b, which is expandable and contractable according to eye separation movement of the barrels. Assembly 922 is pinned at one end of the assembly to a mechanism drive rod 923 to which substrate 920b is mounted. Assembly 922 is pinned on the other end to a positioning rod 923 connecting at one end to substrate 920a and at the other end to a substrate position rod 924.

Scissor assembly 922 is rotably pinned to rods 923 and 924 such that by expanding or contracting the angle of opening of the assembly the angles represented by the pinned junctions on either side of the assembly change accordingly enabling substrates 920a and 920b to remain in their intended positions through adjustment for correct eye separation of a user.

A drive link-pin is provided and adapted to connect drive rod 923 to rotation wheel 916. Drive link-pin 926 is slidably retained within an elongate and arcurate groove 925 placed within and along a portion of the peripheral surface of rotation wheel 916 at a uniform depth. The other end of link 926 is connected to drive rod 923. Turning rotation wheel 916 either left or right displaces link 926 laterally within groove 925 causing synchronous rotation of substrates 920a and 920b about their mounting axis with respective rods 924 and 923 resulting in desired filter function. Drive link-pin 926 has a ball or annular head that is retained within groove 925. The walls of groove 925 may be machined at an inward angle so as to provided retention of the pinhead within the groove during normal operation. In one embodiment, rotation wheel 916 is manufactured of a resilient polymer material and drive-link pin 926 may be snapped into the groove via the pinhead.

In this view, drive link-pin 926 is occupying a dead center position within groove 926 resulting in perpendicular-to-line of sight orientation of substrates 920a and 920b. However, moving rotation wheel 916 to the left or right displaces drive link-pin 926 laterally along groove 925 also causing a planar displacement with respect to the vertical plane of mechanism 922. Therefore, such displacement away from vertical center causes synchronous rotation of the substrates off perpendicular in one or the other direction depending upon which direction wheel 916 is rotated about shaft 917.

Figure 9G:
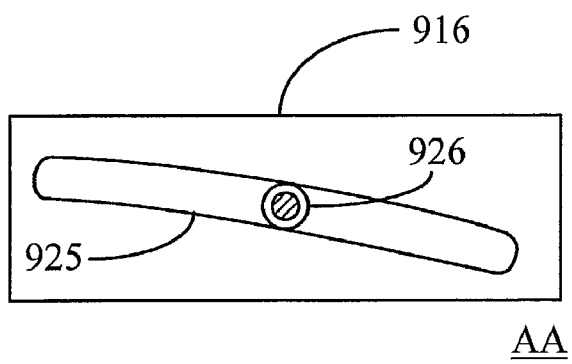
FIG. 9G is an enlarged section view of the rotation wheel of FIG. 9F taken generally along the section lines AA of FIG. 9F.

FIG. 9G is an enlarged section view of rotation wheel 916 taken generally along the section lines AA of FIG. 9F. Groove 925 runs laterally around a length of the periphery of wheel 916 and at an angle diverting from the longitudinal centerline of the wheel. Groove is machined or otherwise formed of a depth and wall construction to accept the pinhead portion of link 926 and also retaining the link in a slidable position within the groove.

Figure 9H:
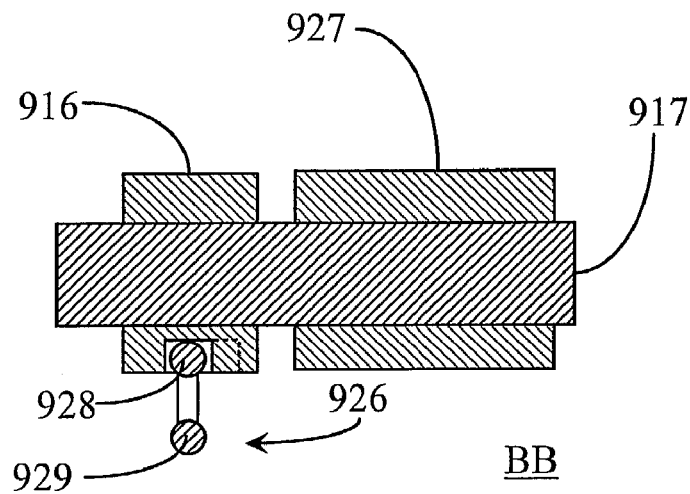
FIG. 9H is an enlarged section view of a portion of the central shaft of FIG. 9F illustrating the rotation wheel and drive link-pin taken generally along the section lines BB of FIG. 9F.

FIG. 9H is an enlarged section view of a portion of central shaft 917 illustrating rotation wheel 916 and drive link-pin 926 taken generally along the section lines BB of FIG. 9 F. The illustrated portion of binocular center shaft or pin 917 runs through a focus wheel 927 and adjacent rotation wheel 916. Link-pin 926 has a pinhead 928 (described above) adapted to fit into and to be retained within groove 925. A second pinhead or ball 929 is provided at the opposite end of the link for mounting to the drive rod (not illustrated). Barrels 918a and 918b each have elongated slots provided there through at the locations where rods 923 and 924 enter. The slots enable relief for the eye separation movements and angular rod displacement during color contrasting operations using wheel 916.

Figure 9I:
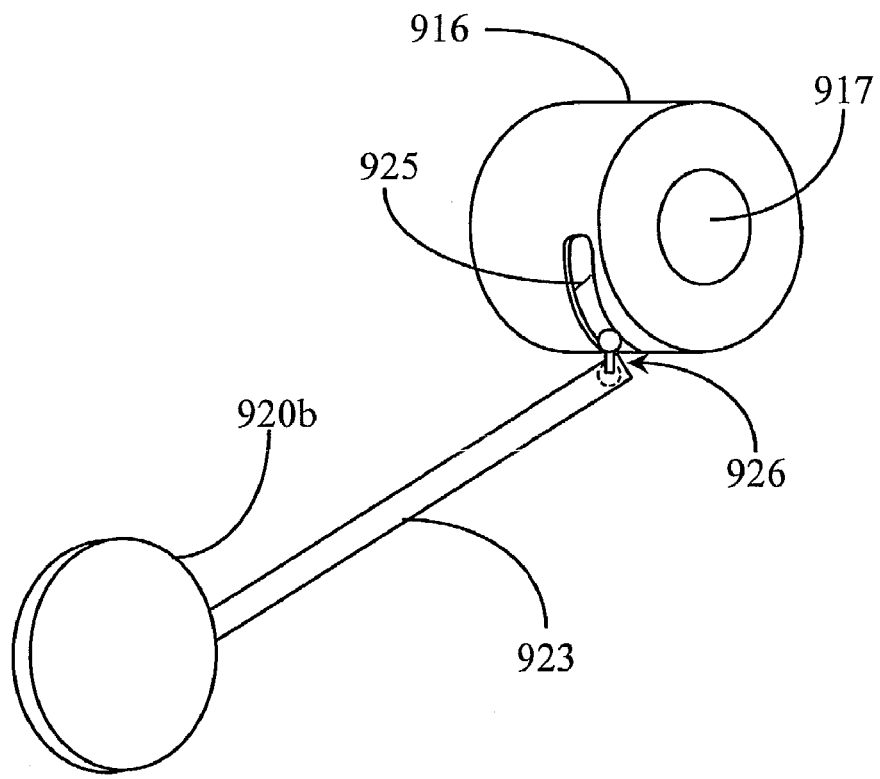
FIG. 9I is an enlarged peripheral view of the drive rod of FIG. 9F illustrating the rotation ability of the substrate via the drive link-pin when displaced laterally within the helical groove of the rotation wheel.

FIG. 9I is an enlarged peripheral view of drive rod 923 and the rotation ability of substrate 920b via drive link-pin 926 when displaced laterally within groove 925 of wheel 916. Wheel 916 may be rotated in either direction to forcibly displace link-pin 926 laterally along groove 925. As the link-pin approaches some distance past dead center in the slot, the angular displacement caused by groove construction results in substrate rotation. The same action is communicated to the other substrate through scissor assembly 922.

Figure 10:
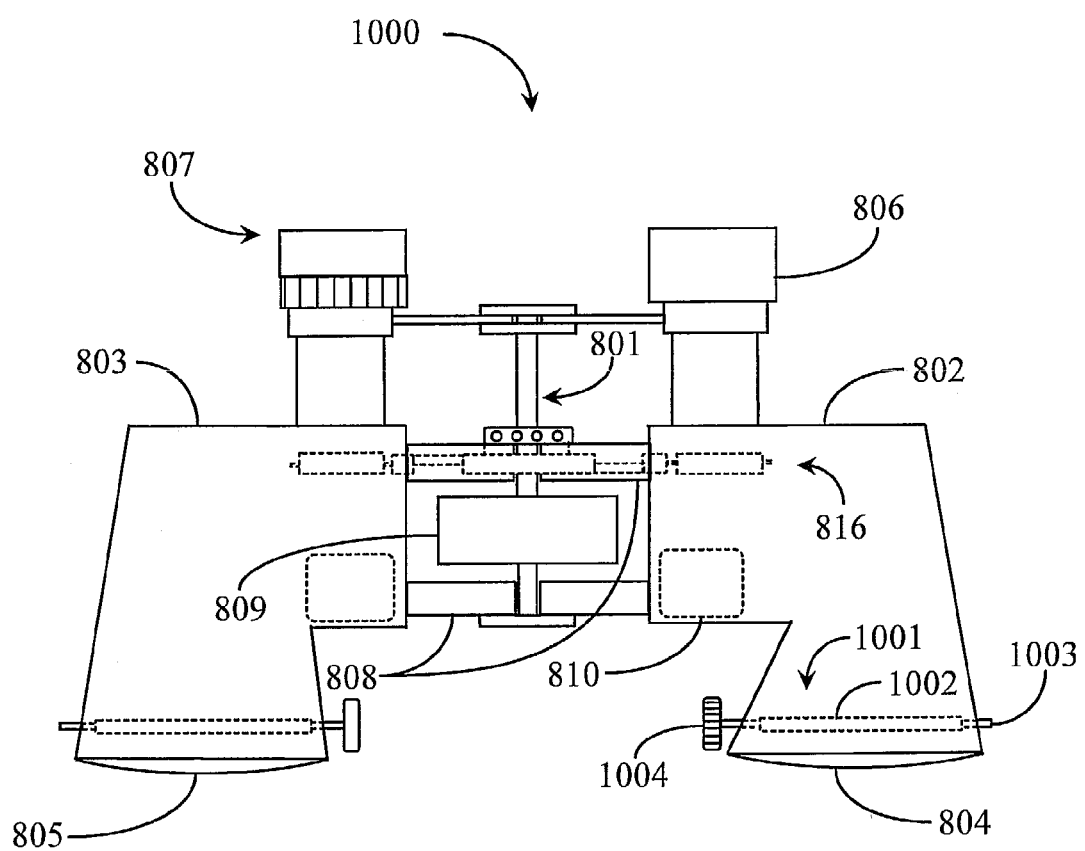
FIG. 10 is a top view of a binocular system enhanced with variable color objective filter mechanisms according to another aspect of the invention.

FIG. 10 is a top view of a binocular system 1000 enhanced with variable color objective filter mechanisms according to another aspect of the invention. Instead of variable multi-layer filter mechanism 816, system 1000 includes two variable color filter mechanisms 1001. One mechanism 1001 is incident to the left barrel 802 and the other identical mechanism is incident to the right barrel 803. Located just behind objective lenses 804 and 805, filter mechanism 1001 includes a shaft 1003 horizontally mounted through the supporting barrel. Shaft 1003 may be provided of steel or aluminum and supports a multi-layered interference film coated substrate 1002 of an annular or of a rectangular profile. It should be noted herein that the type of multi-layered substrate coating might be a "long pass", "short pass", or "spike" filter without departing from the spirit and scope of the present invention. It is known that yellows and greens are middle wavelength while blues are shorter wavelength and reds are longer wavelength. The invention pertains particularly to the variable and fixed use of these filters both independently and in combination in both Galilean and modern prism bearing binocular systems. System 1000 is simple to construct, but may, in some embodiments, require adjustment of two variable filter cells independently by the user. Mechanism 1001 includes a turn wheel 1004. The entire mechanism is mounted using friction bearings or other friction or pressure mount so that the rotated position of substrate 1002 remains after each turn.

In this embodiment, objective substrates 1002 may be independently operated such that the angle of the substrate on the left side may not be the same as the angle of the substrate on the right side. Turn wheel 1004 may be provided with scoring to facilitate easy turning. In one embodiment, an indicative mark may be provided on wheel 1004 to indicate at least one angled position such as perpendicular. Also in this embodiment, mechanism 816 may be unnecessary as fixed absorption filters such as filter 811 may be conveniently located as shown between prisms and eye lenses or anywhere else along the line of sight.

Referring now back to FIG. 7A, graph 703 Curve I also applies to a use case for system 1000 wherein variable color mechanism 816 is set so that the multi-layered elements are perpendicular and the elements 1002 are absorption filters of the same type as filter 506 described with reference to FIG. 5A. The color range of transmission may be assumed identical or at least, very similar because the absorption filter is not angle sensitive. FIG. 7a Curve (II) represents mechanism 816 turned off perpendicular to approximately 22.5 degrees with filters 1002 remaining substantially perpendicular. Curve (III) represents a case where mechanism 816 is turned 45 degrees off of the line of sight and filters 1002 are held perpendicular to that line of sight. The color variations and transmission levels would remain similar as previously described and as illustrated. However, one with skill in the art will recognize that by using different filters and by turning those filter elements differing amounts in combination with each other, a wide variety of differing color transmission curves may be produced in empirical tests without departing from the spirit and scope of the present invention. Importantly, the invention enables variable color selection and filtering at any point incident to objective or eyepiece lenses, or both.

According to another aspect of the present invention the principle of angle-sensitive multi-layered filter coating is applied to a pair of sunglasses enabling a user thereof to vary the color transmission and apparent brightness of those lenses by causing those coated lenses to be disposed at an angle relative to their original position, which is somewhat perpendicular to the line of sight through the lenses.

Figure 11A:
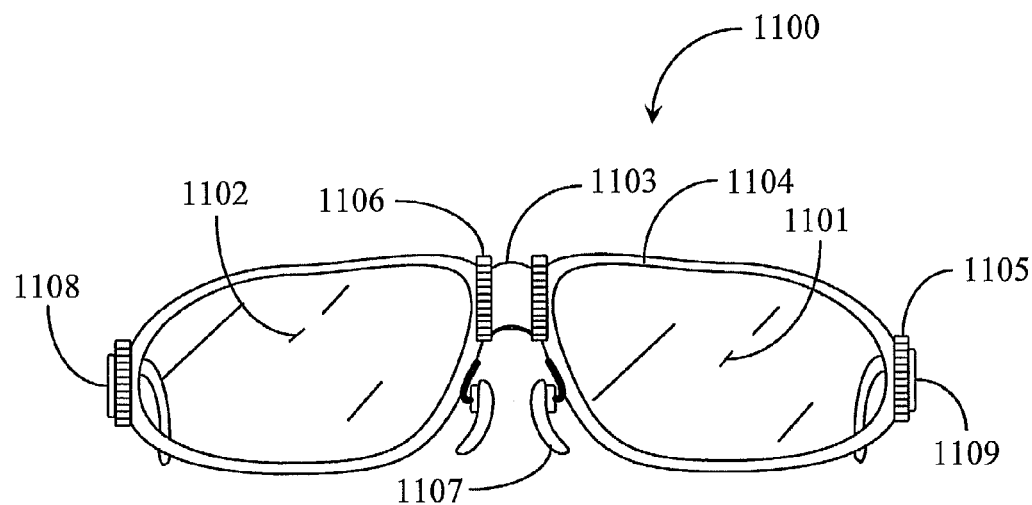
FIG. 11A is a front view of a pair of sunglasses enhanced for variable color selection according to an embodiment of the present invention.

FIG. 11A is a front view of a pair of sunglasses 1100 enhanced for variable color selection according to an embodiment of the present invention. Sunglasses 1100 include a left lens 1101 and a right lens 1102. Both left and right lenses 1101 and 1102 are multi-layered lens elements, which are angularly sensitive in accordance with an embodiment of the present invention. Sunglasses 1100 include a unique hinge arrangement at a bridge 1103 disposed at the center of a lens frame 1104. The arrangement includes 2 hinges 1106 adapted to enable frame 1104 to be angularly disposed from its normal profile at an angular direction toward a user. Lenses 1101 and 1102 may be manufactured plastic or glass lens elements that are subsequently coated as described above. Sunglasses 1100 also include standard nose guards 1107 attached to frame 1104, in this case, with wire.

Sunglasses 1100 also include a unique hinge arrangement disposed at the junctions of frame 1104 and attached arms 1108 and 1109. Hinges 1105 are adapted to enable arms 1108 and 1109 to be angularly disposed away from a user beyond a substantially perpendicular angle with respect to frame 1104 that would otherwise be the far range of opening for arms 1108 and 1109. Hinges 1106 and 1105 are adapted differently from each other with respect to angle range allowed for each hinge, but otherwise may be manufactured from the same materials such as steel, aluminum, brass, plastic, or any other rigid materials. In one embodiment, both hinges 1106 and 1105 may be memory loaded using spring wire or the like (not illustrated) so that they naturally remain at their adjusted angular positions.

Figure 11B:
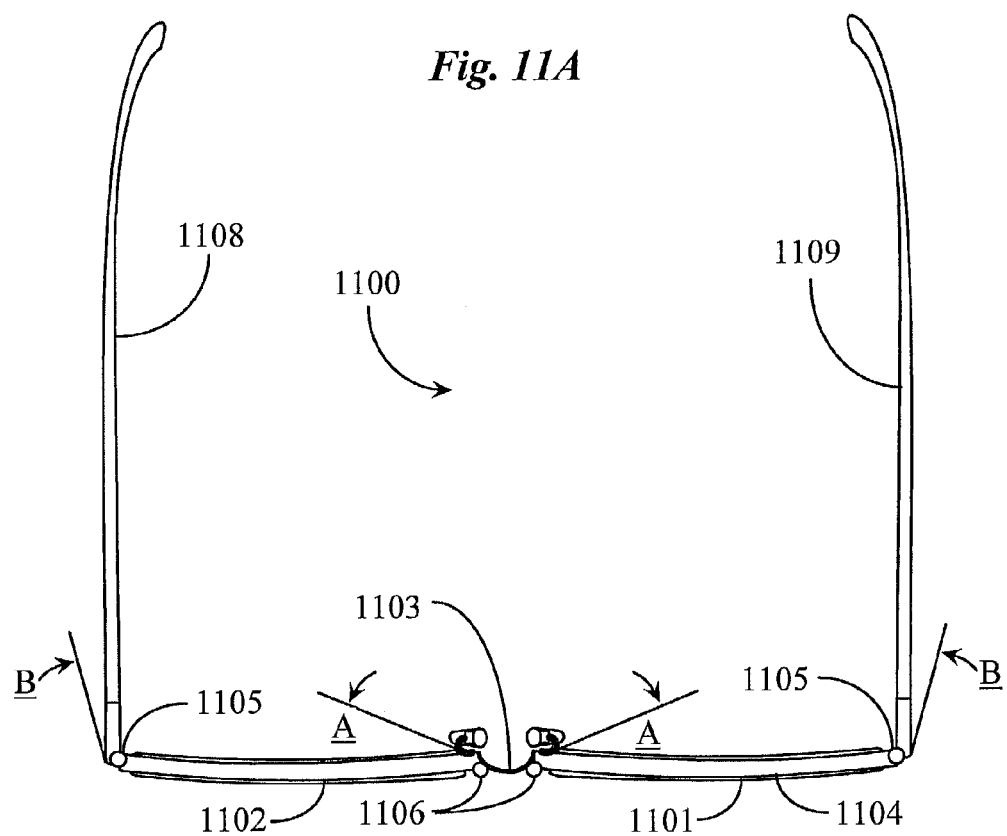
FIG. 11B is a top view of the sunglasses of FIG. 11A illustrating the angles to which hinge-affected components may be adjusted to according to an embodiment of the present invention.

FIG. 11B is a top view of sunglasses 1100 illustrating the angles to which hinge affected components may be adjusted to according to an embodiment of the present invention. Hinges 1106 enable frame 1104 to be angularly disposed along angles A on either side of bridge 1103 while glasses 1100 are being worn by a user. Angle A may vary somewhat in degree, however 30 degrees represents a preferred angle in keeping with the multi-layered and angularly sensitive coatings described further above.

Hinges 1105 disposed at the arms 1108 and 1109 enable the arms to swing past perpendicular to angle B on both sides in a direction away from the user. Angle B may vary somewhat, however 10 to 15 degrees is sufficient for the purpose of the present invention. In use, a user may grasp frame 1104 while wearing glasses 1100 and angularly dispose the frame to assume the position illustrated by angles A. In this action, arms 1108 and 1109 are automatically disposed to assume their new positions illustrated by angles B on either side of the users head. This enables the first angular position while still affording comfort for the user with respect to arms 1108 and 1109 where they fit over the user's ears.

At the angled position of frame 1104 along angles A, lenses 1101 and 1102 exhibit a different color filtering properties than they do in their normal positions. For example, at the new angle, the user sees more greens and yellows and less blues and reds thus sharpening the view (color contrasting) and brightening the view at the same time. This unique capability may be useful, for example while driving on a partly sunny day. During moments of bright sunlight, the user may keep the glasses at normal position wherein the lenses 1101 and 1102 are substantially in a same plane. When cloud-cover blocks out the sun, the user may urge glasses 1100 into an angled position enabling brighter vision at more contrast. Lenses 1102 and 1102 may in one embodiment, be Gamcolor™ multi-layered lenses as described further above.

Figure 12:
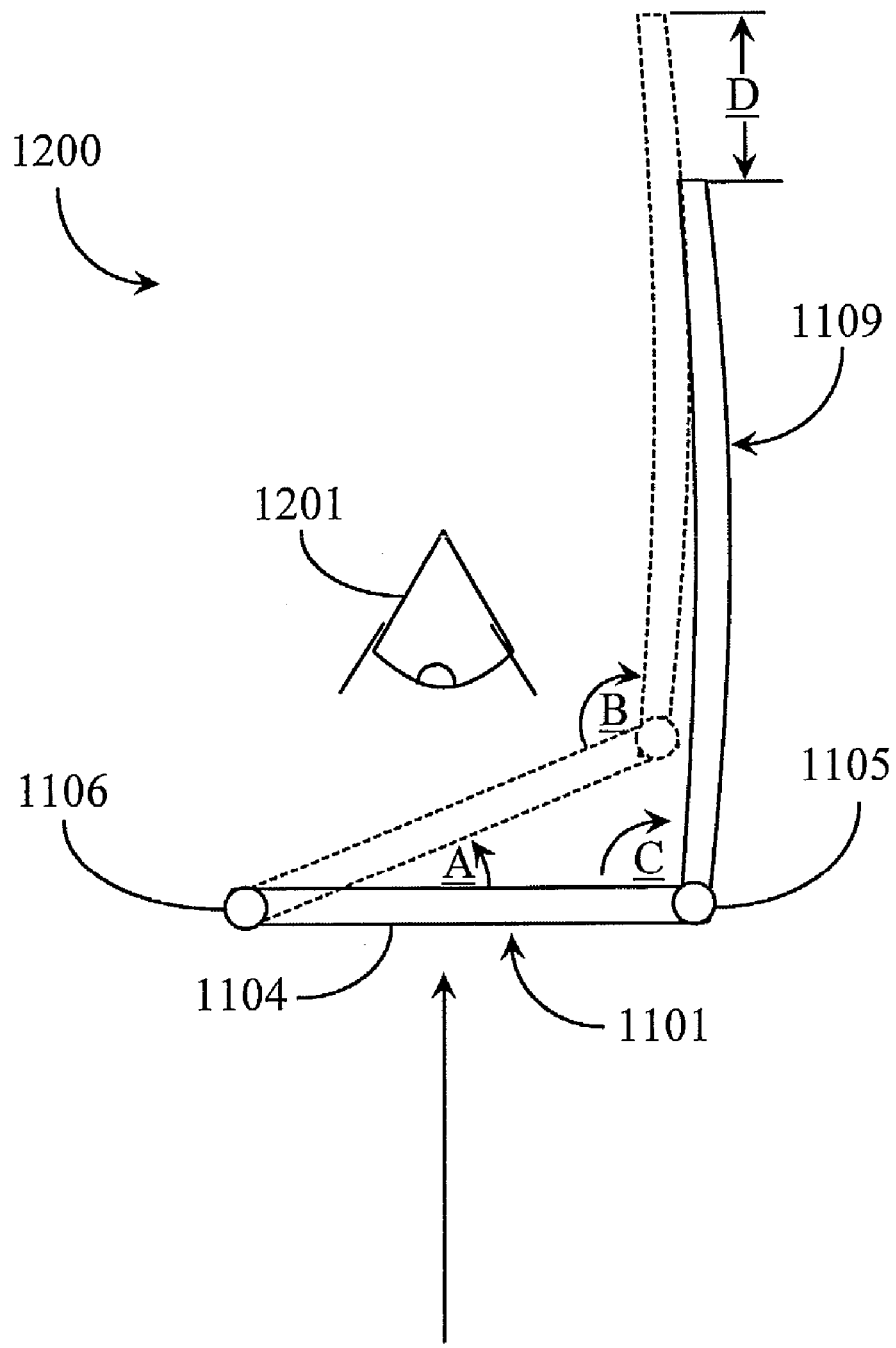
FIG. 12 is a block diagram illustrating the motion of angular disposition of the glasses of FIG. 11B according to an embodiment of the present invention.

FIG. 12 is a bock diagram 1200 illustrating the motion of angular disposition of glasses 1101 according to an embodiment of the present invention. Glasses 1101 are represented herein by one side, which is deemed sufficient to show motion as the opposing side moves in the same manner. In normal position as worn on a user, frame 1104 is at a substantially perpendicular relationship to the line of sight of the user as illustrated herein by a user eye 1201 and the associated directional arrow indicating line of sight direction.

In this position, arm 1109 is substantially perpendicular to frame 1104 at an angle C reflecting a normal angle of wear. Urging frame 1104 backward toward the user causes frame 1104 to be disposed at angle A about hinge 1106. The second position is illustrated herein by a dotted boundary that represents frame 1104 at the new position. The action simultaneously disposed arm 1109 backward for a distance D and to assume angle B in relationship to frame 1104 at the new position. The second arm position is also represented herein by a dotted boundary. At this new angle, the color contrast is remarkably different than in the first position as the line of sight is now at approximately 30 degrees off perpendicular to the horizontal axis plane of frame 1104, hence 30 degrees of perpendicular to the axis plane of the supported multi-layered and angularly sensitive lens 1101.

Referring now back to FIG. 7D, depending on the exact design of the interference multi-layered coating, curve (I) might represent a color transmission through lens 1101 before disposing the lens at an angle. Curve (II) might represent the color transmission through lens 1101 at the proposed 30-degree angle. There are many variable possibilities. The unique hinge arrangement may be adapted to work with a wide variety of eye coverings such as with goggles, safety glasses, helmets, welding shields, and other coverings. Different types of multi-layered and angularly sensitive filters might be provided, for example, to goggles worn under water to improve color contrast and to brighten the image view. In the examples illustrated, the lenses are disposed angularly toward the user in a "V" configuration. That should not be construed as a limitation of the present invention. In other embodiments, lenses may be adapted to rotate slightly within their frames about horizontal or vertical axis similar to the substrates described with respect to mechanisms 816 or 501 described further above. There are many possibilities.

The various embodiments described herein illustrate variable color filtering components used in combination, in some instance, with at least one unique lens arrangement to produce wider and brighter fields of view for Galilean type binocular systems and for enhancing other optical systems such as prism bearing optical systems and even simple eye glasses for selectable color filtering.

It is noted herein that in one embodiment of the invention already described, there is at least one filter which is essentially fixed or otherwise unchanging relative to the color spectrum allowed to pass through it while one or more other filters are caused to pass a changing spectrum by change of angle or position. Relative to this particular exemplary embodiment, the bell shaped response curve of the human eye relative to the visible color spectrum as shown in FIG. 7E is utilized in accordance with the invention to leverage the color contrast of colors viewed by manipulating at least one angle or position-sensitive filter. To further illustrate, the function of the filter described herein as an absorption filter and having no angular sensitivity may in many instances be replaced by a fixed multi-layered interference filter having limited angular sensitivity.

One with skill in the art will clearly visualize upon inspection of the human eye response curve of FIG. 7E, and then comparing it to the response curve of a long wave pass filter, such as the multiplayer interference curve of FIG. 7C that a result is a marked change in color contrast perceived by the human eye. It is further apparent in the embodiment just described that filters passing a fixed color spectrum are utilized in sequence with the movable variable filters to limit the passage of contrast impeding wavelengths, for example blue wavelengths, thus making those wavelengths not limited by the variable filter appear even brighter to the eye. In implementing the invention according to the particular embodiment, long pass wave filters or short pass wave filters may be used.

Process principles taught in the present specification may be utilized in many optics-based apparatus to yield tunable high-definition and color enhancement of objects observed or photographed through the optics systems of such apparatus. For example, tunable, high-definition imagery may be provided for gun sights, telescopes, cameras, camera lenses, telescope eyepieces, swimmer's goggles, specialized goggles or glasses for watching television of sporting events, and many other apparatus, all of which may be enhanced with angularly-adjustable (tiltable) angle-sensitive filters to yield higher-definition color images than were before available in the art.

FIG. 7b described above graphs color spectrum transmission through a representative angle-sensitive filter positioned at ninety degrees (perpendicular) to incident light. The graph, and therefore the color contrast obtained will be as shown, regardless of where in the optical path the filter is placed as long as the angle is the same with respect to impinging light. The filter may be placed ahead of the optical objective element, behind the element, or behind or ahead of any other optical element in the device with the same result. This fact provides opportunity for broad latitude for location and placement of a filter in the optical devices described above, and in other optical devices.

Figure 13:
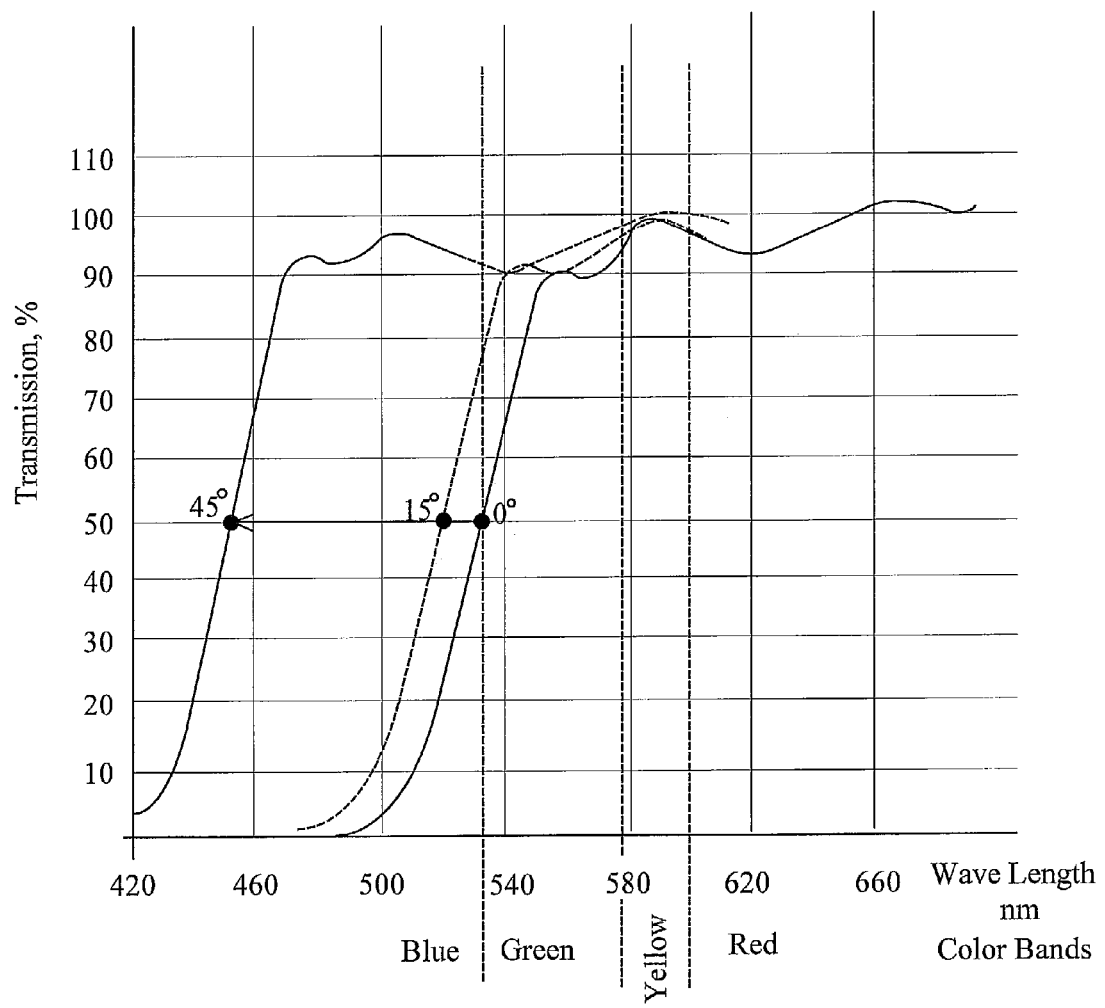
FIG. 13 is a graph of color spectrum transmission through an angle-sensitive filter used in an embodiment of the present invention.

FIG. 7d described above is a graph of color transmission for a filter that is not angularly sensitive, therefore a fixed-absorption filter, in combination with an angularly-sensitive, angularly-adjustable filter, as the adjustable filter is tilted through an angle of from 0 to 45 degrees relative to the path of incident light. FIG. 13 is a graph of transmission for a representative angularly-sensitive filter alone, such as, for example, a Rosco Permacolor™ No. 35200 yellow multilayer dichroic filter, or other available, when tilted progressively through angles from zero to forty-five degrees from perpendicular relative to the direction of incident light.

It will be apparent by referral to the graph of FIG. 13, and also by actual observation through such a filter, that the object field will appear bright yellow-green when the filter is positioned perpendicular to the direction of incident light. Importantly, a considerable amount of red and some blue does come through under this condition. When the filter is tilted slightly, at about fifteen degrees, more green is transmitted, and, remarkably, the apparent color contrast between green and red actually increases due to the fact that the human eye is much more responsive to green light than to red light, as was illustrated previously with regard to FIG. 7e.

It should be noted that although FIG. 13 reveals that only about 20% more of the green wavelengths come through this representative filter as it is tilted to fifteen degrees from perpendicular, FIG. 7e shows that the human eye is at least two-hundred % more responsive at these same wavelengths; yielding as much as ten times leverage of green color contrast versus red.

As this representative filter is tilted to greater angles from perpendicular, toward forty-five degrees, increasingly more blue-green light comes through and red is apparently less strong. "Apparently" is the correct word, because the blue-to-red contrast is again enhanced more than the actual ratio of blue to red light, due to the response of the human eye. At about forty-five degrees tilt the unclouded sky will appear an enhanced greenish-blue, and red and yellow will appear about as they do without a filter.

The process of tilting an angularly-sensitive filter to change the color spectrum transmitted, and of leveraging the non-linear color response of the human eye to achieve high-definition color contrast is unique to embodiment of the present invention. The total effect is to provide high-definition and tunable color contrast to an observed image. For example, viewing an ordinary analog television display through such a filter, mounted in spectacle frames, allows a user to tune the color contrast appearance of the analog TV image to rival that produced by a High-Definition digital television. Deleterious scattered blue light can be definitely eliminated, as would be the case with ordinary driving or shooters glasses. In addition, contrast of other colors is markedly enhanced.

Figure 14A:
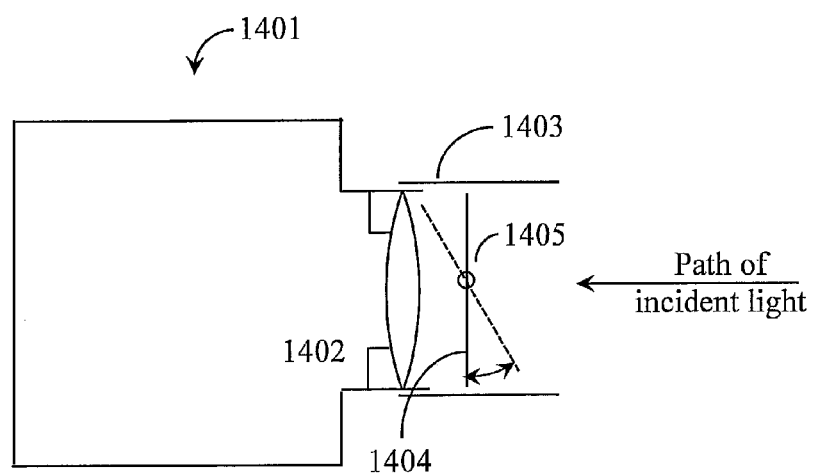
FIG. 14A illustrates a camera with lens having a tiltable angle-sensitive filter according to an embodiment of the present invention.

FIG. 14A is a schematic of a camera 1401 according to an embodiment of the invention, having a lens 1402 and a filter holder tube 1403 enclosing a tiltable, angularly sensitive filter 1404 rotatable about a pivot 1405. By adjusting the angle of filter 1404 relative to the path of incident light, a user may adjust the color contrast for the image formed by the lens on either film or a light-sensor array for a digital camera. The angularly-adjustable filter is conveniently placed in front of the existing lens of the camera, but could be placed anywhere in the light path.

Figure 14B:
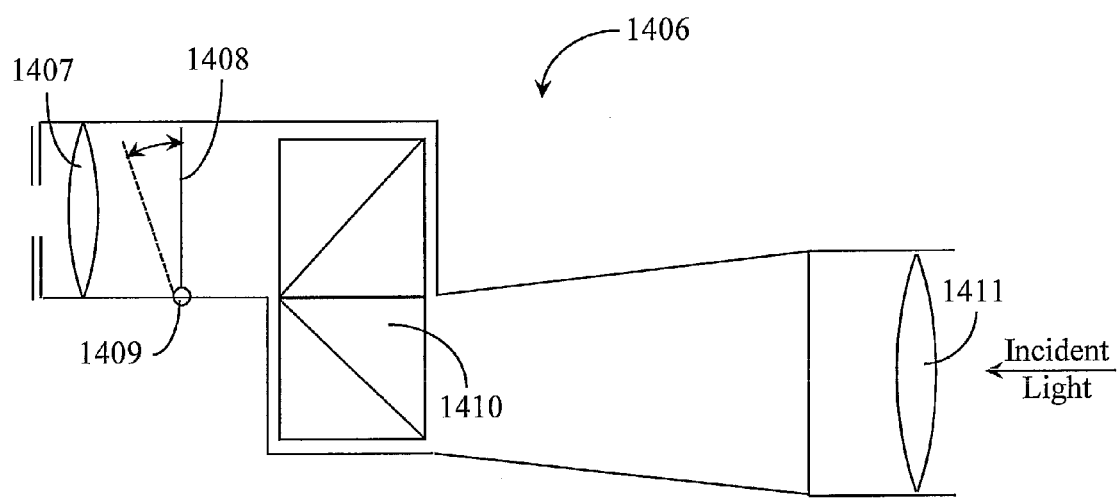
FIG. 14B illustrates a spotting scope having an image-righting prism and a hinged angle-sensitive filter according to an embodiment of the invention.

FIG. 14B is a schematic of a spotting scope 1406 according to an embodiment of the present invention comprising an eye lens 1407 (at the user's eye), an angularly-adjustable angle-sensitive filter 1408 rotatable about a pivot 1409, image righting prisms 1410, and an objective lens 1411. By adjusting the angle of filter 1408 relative to the path of incident light, a user may adjust the color contrast for the image formed on the user's retina. The angularly-adjustable filter is conveniently placed in front of the eye lens, but could be placed anywhere in the light path.

Figure 14C:
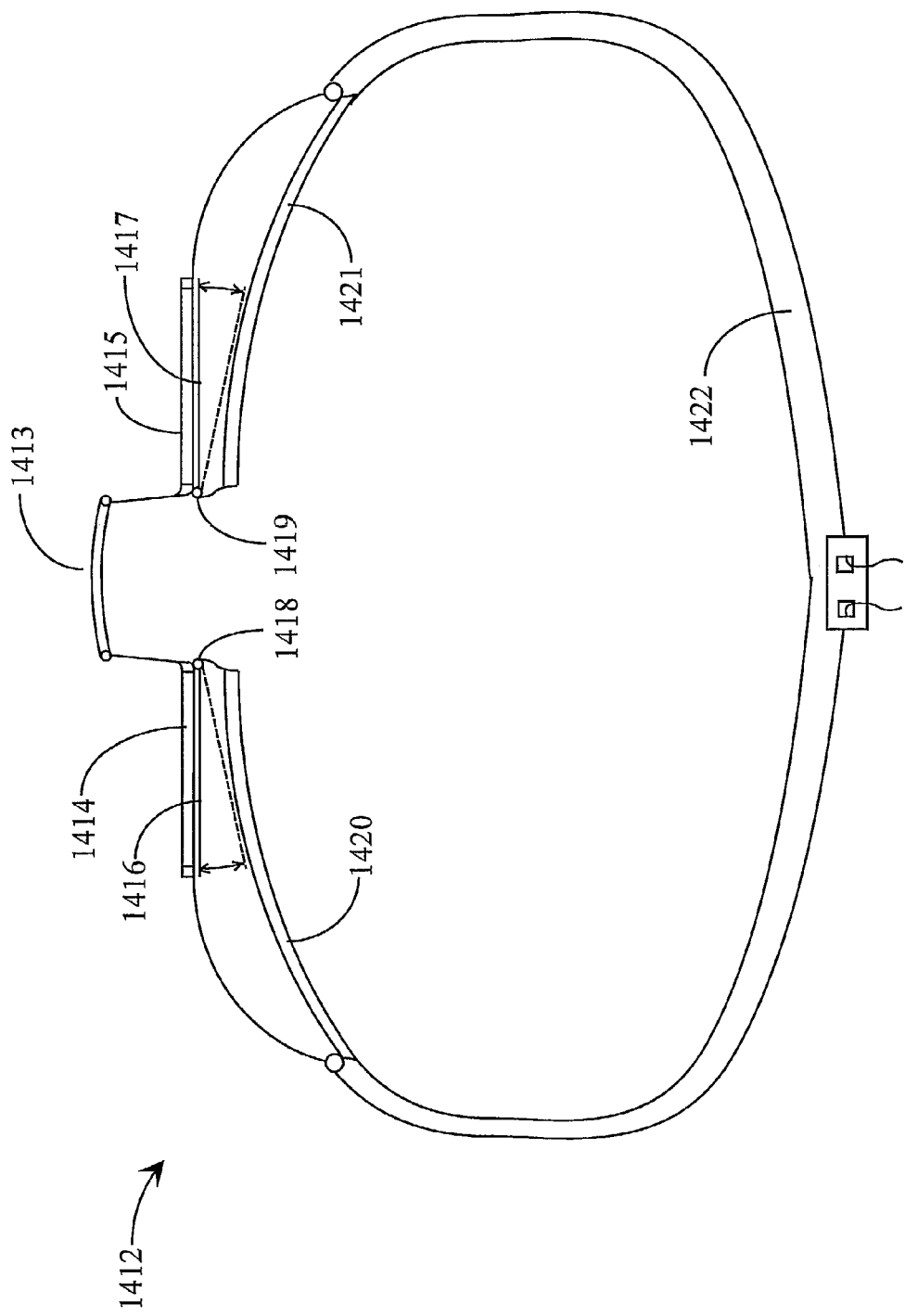
FIG. 14C illustrates a pair of swimmer's goggles having hinged angle-sensitive filters for each eye.

FIG. 14C is a top view of a pair of swimmer's goggles 1412, comprising a nose bridge 1413, a left lens 1414, a right lens 1415, a left angularly adjustable, angle-sensitive filter 1416, a right angularly adjustable, angle-sensitive filter 1417, a left filter pivot 1418, a right filter pivot 1419, a left face gasket 1420, a right face gasket 1421, and a headband 1422. By adjusting the angle of filters 1416 and 1417 relative to the path of incident light, a user may adjust the color contrast for the image formed on the user's retina. The angularly-adjustable filter is conveniently placed behind the lenses, but could be placed anywhere in the light path.

Figure 14D:
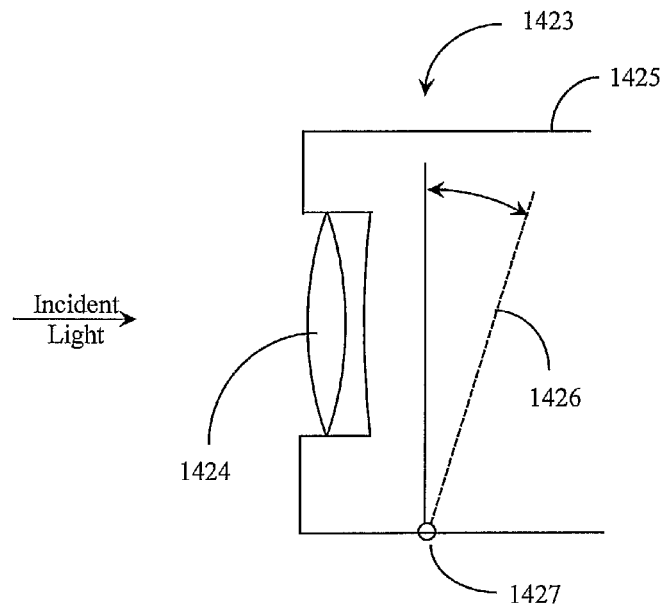
FIG. 14D illustrates a telescope eyepiece having a tiltable, angle-sensitive filter.

FIG. 14D is a schematic of a telescope eyepiece 1423 having an eye lens 1424, an eye piece tube 1425, and an angularly-adjustable angle-sensitive filter 1426 adjustable angularly about a pivot 1427. By adjusting the angle of filter 1426 relative to the path of incident light, a user may adjust the color contrast for the image formed on the user's retina. The angularly-adjustable filter is conveniently placed behind the lens, but could be placed anywhere in the light path.

Another of the advantages of the invention involves rifle telescope gunsights. Rifle telescope gunsights utilizing sets of various fixed position color filters are provided by manufacturers such as Leupold Sights™, a manufacturer of high-quality optical equipment, to provide a shooter with a variety of available color contrasts according to prevailing conditions. This speaks to the utility of color filters in providing enhanced contrast; but in this prior-art case the user must remove one filter and replace it with another to respond to changing light conditions.

Figure 14E:
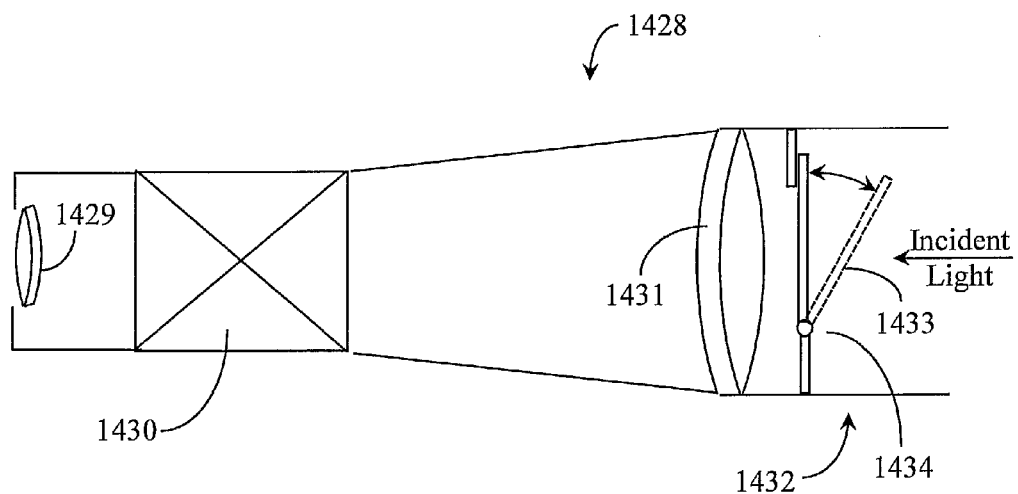
FIG. 14E illustrates a riflescope incorporating a tiltable, angle-sensitive filter in an embodiment of the present invention.

FIG. 14E is a schematic of a telescopic gunsight 1428 comprising an eye lens 1429, an image-righting porro prism 1430, an objective lens 1431, and a filter cell 1432 having an angularly-adjustable filter rotatable about pivot 1434. By adjusting the angle of filter 1433 relative to the path of incident light, a user may adjust the color contrast for the image formed on the user's retina. The angularly-adjustable filter is conveniently placed before the objective lens, but could be placed anywhere in the light path.

Figure 15:
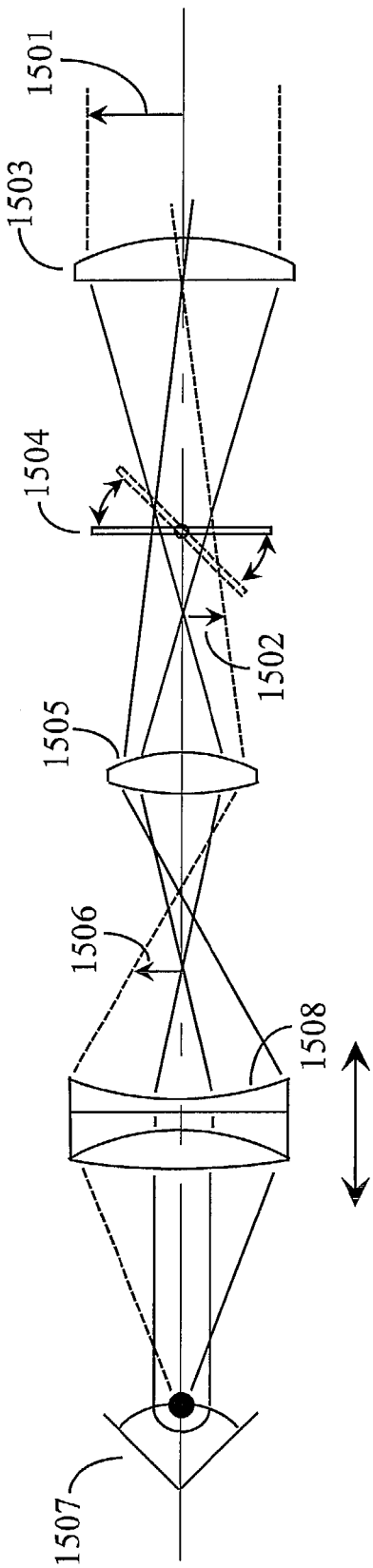
FIG. 15 is a schematic optical layout of a telescope, such as a zoom lens riflescope, in an embodiment of the invention.

FIG. 15 is a schematic of a telescope, such as a contemporary zoom lens riflescope, having a center lens to provide an upright image for the eyelens, and a rotating angle-sensitive filter for control of color contrast according to an embodiment of the present invention.

Upright arrow 1501 in the distant field is imaged inverted at first image plane 1502 by objective lens 1503 after passing through rotatable angle-sensitive filter 1504. The position chosen for filter 1504 may be advantageous because the optical beams narrow down at this point, allowing the angle-sensitive filter 1504 to have a smaller aspect. Another narrowing of the optical beams occurs between center lens 1505 and zoom eyelens 1508. Zoom eyelens 1508 is shown movable to provide increase/decrease in magnification/field. Center lens 1505 reimages the arrow reinverted to upright at second image plane 1506, where the upright image is then observed by the eye 1507 through zoom eyelens 1508. Windage and bullet drop elevation may be provided by moving center lens 1505 up, down and sideways in its plane. In addition, the color contrast control filter 1504 may be located at any location along the optical path, i.e. the filter 1504 may be located ahead of 1503, or behind 1505, or behind 1508, and control of color contrast can be achieved so long as the angle sensitive filter is installed so as to cover the field at the location chosen.

The inventor is aware that a planar optical apparatus such as the angularly adjustable optical filters that have been described in many embodiments above, may introduce refractory effects to the optical beams passing through the apparatus. The refraction that might take place, of course varies with the angle of inclination of the optical rays with the surfaces of the planar filter element.

The inventor has built most of the devices described generally above, has tested the effects, and has found that refraction is seldom a problem with most of the apparatus described. There can be some small problem with a riflescope, and the effect can be corrected by adjustments normally available with any riflescope for windage and elevation. Furthermore, in some embodiments a second clear glass plate of the same thickness and refractive characteristics as the filter plate may be installed in the optical path either before or after the filter plate, and may also be integrated with the adjustment mechanism for the filter plate, such that the clear glass plate tilts in an angular direction opposite to the tilt of the filter plate, but through the same angle. Thusly the refraction of one is corrected at the other, so there is no net refractive dislocation along the optical path.

Further to the above, the inventor has shown relatively simple mechanisms for mounting and rotating filter plated in various optical instruments. It should be apparent to the skilled person that the mechanism by which the filter plate is tilted may vary widely, and the mounting may vary widely as well. It is the fact of angular adjustment that is important, and the angular adjustment may be done in many ways, including manually, or by motor-driven mechanisms, or magneticallycoupled mechanisms, and in a number of other ways, all within the spirit and scope of the invention.

It will be apparent to the skilled artisan that there are many alterations that might be made in the embodiments of the invention described above without departing from the spirit and scope of the invention. For example, it is well-known that there are many variables in the materials that may be used to construct practical apparatus of the many sorts described, and dimensions and arrangements may vary as well, among other differences. Therefore the methods and apparatus described herein should be afforded the broadest scope under examination. The present invention may be practiced according to various embodiments described using some of or all of the described components and features without departing from the spirit and scope of the invention. Moreover, other applications involving sight wherein selectable color filtering via tilting or rotating multi-layered angularly sensitive lens elements or treated apparatus are conceivable. For example, mirrors, windows, or other viewing ports may be adapted to practice the present invention. Therefore, the spirit and scope of the present invention shall be limited only by the following claims.

What is claimed is:

1. An apparatus for forming an image, comprising:
   one or more lenses in an optical path;
   at least one angular-sensitive dichroic filter in the optical path, in which transmission of color of light varies with change in angular orientation of the filter with reference to the direction of light in the optical path; and
   a mechanism for adjusting the angle of the dichroic filter;
   wherein the apparatus comprises a zoom lens riflescope having an eye lens, an objective lens, and a center lens to provide an upright image for the eye lens.

2. The apparatus of claim 1 wherein the dichroic filter and associated adjustment mechanism are positioned in the light path where the optical beam is most narrow between the center lens and the objective lens.

3. The apparatus of claim 1 wherein the dichroic filter and associated adjustment mechanism are positioned in the light path where the optical beam is most narrow between the center lens and the eye lens.

4. A method for improving color contrast for an image provided by an optical instrument, comprising steps of:
   (a) placing an angle-sensitive dichroic filter in the optical path of light transmitted through the instrument; and
   (b) changing the angle of the dichroic filter by an adjustment mechanism thereby improving the color contrast of the image;
   wherein the apparatus comprises a zoom lens riflescope having an eye lens, an objective lens, and a center lens to provide an upright image for the eye lens.

5. The method of claim 4 wherein the dichroic filter and associated adjustment mechanism are positioned in the light path where the optical beam is most narrow between the center lens and the objective lens.

6. The method of claim 4 wherein the dichroic filter and associated adjustment mechanism are positioned in the light path where the optical beam is most narrow between the center lens and the eye lens.

* * * * *